United States Patent [19]

Fung et al.

[11] Patent Number: 5,630,163
[45] Date of Patent: May 13, 1997

[54] COMPUTER HAVING A SINGLE BUS SUPPORTING MULTIPLE BUS ARCHITECTURES OPERATING WITH DIFFERENT BUS PARAMETERS

[75] Inventors: Henry T. Fung; Siu K. Tsang, both of San Jose; Phillip M. Mitchell, Milpitas; Norman P. Farquhar, San Jose, all of Calif.

[73] Assignee: Vadem Corporation, San Jose, Calif.

[21] Appl. No.: 452,246

[22] Filed: May 26, 1995

Related U.S. Application Data

[63] Continuation of Ser. No. 744,710, Aug. 9, 1991, abandoned.

[51] Int. Cl.$^6$ ................................................ G06F 13/00
[52] U.S. Cl. ................. 395/800; 395/200.13; 395/281; 395/282; 395/297; 395/306; 395/307; 395/865; 395/869; 364/238; 364/238.2; 364/238.3; 364/238.9; 364/DIG. 1
[58] Field of Search ........................... 395/800, 200, 395/275, 200.13, 281, 282, 297, 306, 307, 865, 869; 364/DIG. 1, 238, 238.2, 238.3, 238.9

[56] References Cited

U.S. PATENT DOCUMENTS

| | | | |
|---|---|---|---|
| 3,899,775 | 8/1975 | Larsen | 364/405 |
| 4,527,237 | 7/1985 | Frieder et al. | 395/200 |
| 4,639,859 | 1/1987 | Ott | 395/325 |
| 4,698,748 | 10/1987 | Juzswik et al. | 364/200 |
| 4,747,041 | 5/1988 | Engel et al. | 364/200 |
| 4,758,993 | 7/1988 | Takemae | 365/222 |
| 4,797,853 | 1/1989 | Savage et al. | 395/425 |
| 4,918,645 | 4/1990 | Lagoy, Jr. | 395/425 |
| 5,125,084 | 6/1992 | Begun et al. | 395/375 |
| 5,129,090 | 7/1992 | Bland et al. | 395/725 |
| 5,140,680 | 8/1992 | Best | 395/325 |
| 5,440,754 | 8/1995 | Goeppel et al. | 395/800 |

*Primary Examiner*—Meng-AI T. An
*Assistant Examiner*—Dzung C. Nguyen
*Attorney, Agent, or Firm*—William B. Walker

[57] ABSTRACT

A data processing system including a central processing unit and control circuitry on a single chip connected by a common bus to two or more bus devices having different sets of bus parameters. A first set of bus parameters functions as a memory bus for transfers to and from main memory, a second set of bus parameters functions as an I/O bus for I/O device transfers and a third set of bus parameters functions as a video bus for transfers to a video display. Each set of bus parameters has different timing selected to maximize transfers for the particular bus function (main memory, I/O, video or other) implemented by the bus parameters.

27 Claims, 11 Drawing Sheets

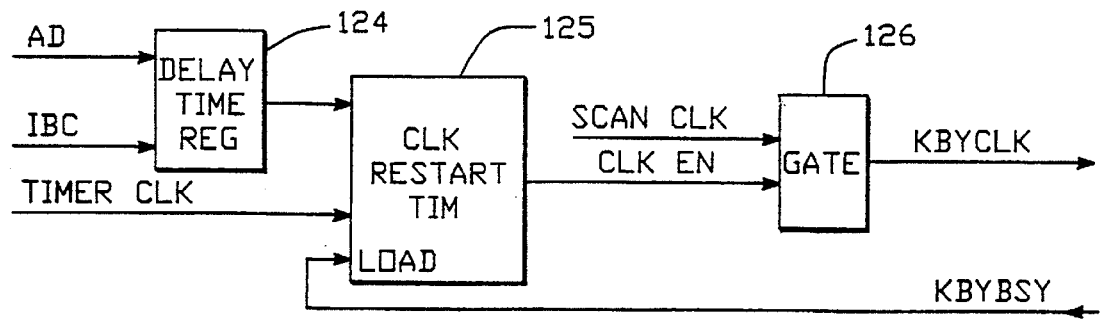
FIG.—15
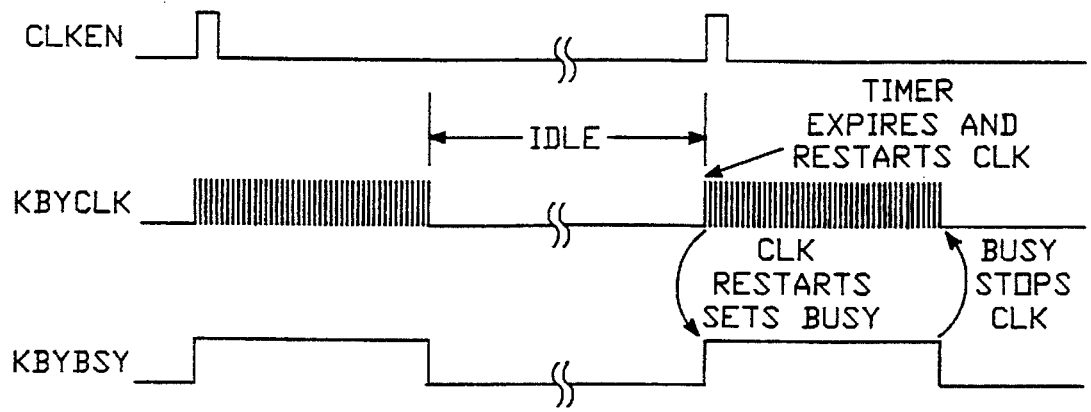
FIG.—16
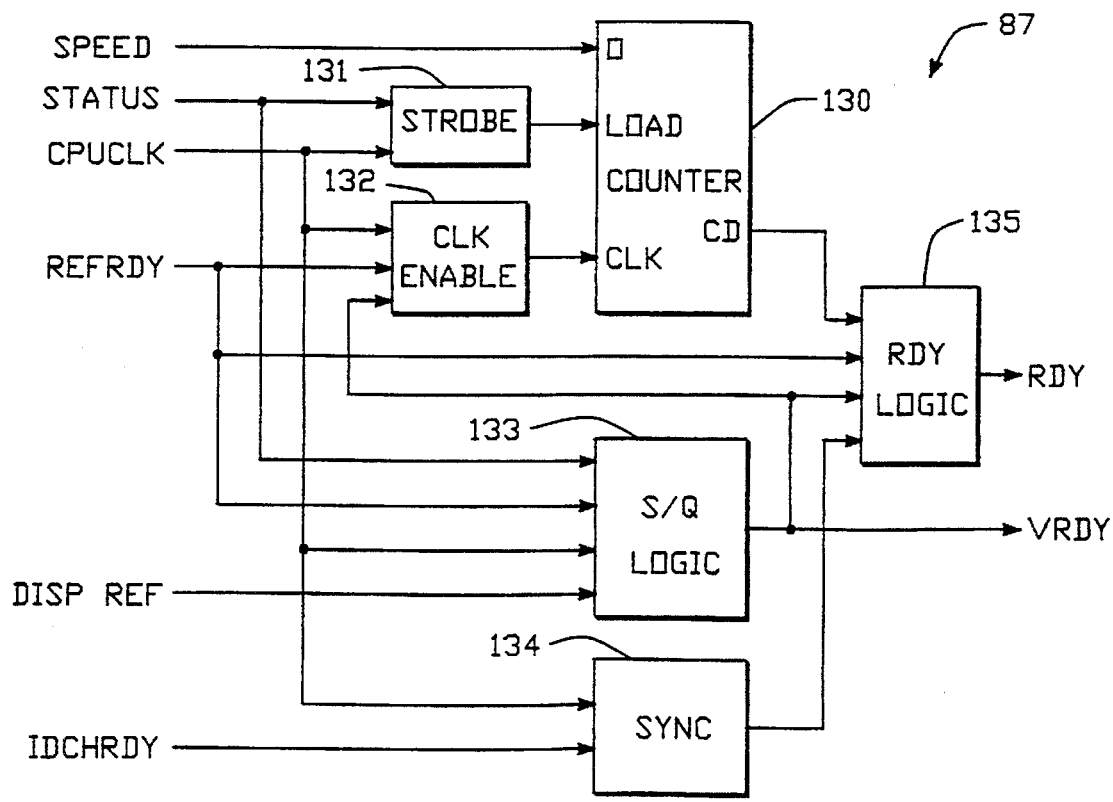
FIG.—17

COMPUTER HAVING A SINGLE BUS SUPPORTING MULTIPLE BUS ARCHITECTURES OPERATING WITH DIFFERENT BUS PARAMETERS

This application is a Continuation of application Ser. No. 07/744,710, filed on Aug. 9, 1991, now abandoned.

BACKGROUND OF THE INVENTION

The present invention relates to the field of computer systems and more particularly to small computer systems.

Typical small computer systems have a central processing unit (CPU), main storage, a display, and various input/output (I/O)) devices (such as a keyboard, a printer and disk memory) connected together by buses. I/O devices typically connect to an I/O bus through device controllers such as a display controller, a disk controller and, when direct memory access (DMA) is employed, a DMA controller.

Computer systems, both small and large, are controlled by software in various forms. The operating system (OS) software functions as the interface between application program software and the computer hardware. In small systems, the software for controlling I/O devices is known as the basic input/output system (BIOS).

The BIOS typically includes self-test routines, device-handling routines, and system-service routines. The self-test routines are executed to ensure reliable operation of the system. The device handling routines control the operation of input/output devices. The system service routines provide program loading, memory size determination, equipment determination, time-of-day clock, screen function, and other system services.

Communication between the central processing unit and an I/O device typically involves execution by the central processing unit of an I/O instruction. Each I/O instruction is decoded to initiate read or write operations with an I/O device.

Computer systems, both small and large, have bus architectures that depend upon physical attributes such as board size, connector type, arbitration methods, synchronization protocols, transfer protocols, semiconductor technologies, and power and performance requirements. In small computer systems, many or all of the I/O devices connect to a common I/O bus where only one device at a time has access to the common I/O bus.

For an I/O bus, priority schemes are employed to determine which I/O device is to have access to the bus when more than one I/O device is in contention for the bus. Frequently, the central processing unit is given lowest priority so that when direct memory access (DMA) occurs between a disk and main storage, the central processing unit is forced to release control of the I/O bus.

Computer systems of all sizes have generally employed, in addition to an I/O bus, a number of special-purpose buses since a single general-purpose bus has been inadequate for satisfactory operation and performance.

Typically, in small computer systems, a dedicated memory bus is employed to optimize transfers between the central processing unit and main storage, a dedicated I/O bus is provided to optimize transfers to and from I/O devices and a display bus is provided to optimize transfers to a display. Other buses may also be provided. For example, extension buses are used to connect a number of physical modules together to form a single virtual module. Extension buses add bandwidth to the system and thereby reduce the load on other system buses.

Each bus in the computer system is characterized by a number of parameters. Bus clock speed is one bus parameter. Different semiconductor technologies are used as a function of bus clock speed to drive buses. The semiconductor technologies include CMOS (complementary metal oxide semiconductor), TTL (transistor-transistor logic), ECL (emitter-coupled logic), and BTL (backplane transceiver logic).

Other bus parameters are data width, address width, control line number and multiplexing. Typically, the data width of the bus is matched to the data width of the central processing unit. Processors of 16-bit generally match to 16-bit or more buses; 32-bit processors match to 32 bit or more buses, and so forth.

The number of bus pins is another bus parameter. The number of bus pins has been reduced by using buses that multiplex addresses and data for a particular bus. Multiplexed buses transfer data and addresses using the same bus lines for addresses and data.

Bus bandwidth is another bus parameter. Bandwidth of a bus is measured by measuring the bus performance when the system executes an application program. A useful measurement of bus performance is obtained by dividing the sustainable bus bandwidth by the number of pins used by the bus thereby giving the transfer rate per pin.

Another factor affecting bus architecture is the presence of cache memory. Cache memory both improves access time and eliminates duplicate memory accesses thereby reducing bus traffic.

One conventional small system is represented by Advanced Micro Devices' (AMD) AM286LX Integrated Processor which employs a conventional architecture having three separate buses. The IBM PC XT/AT architecture is another conventional multibus design based on maximizing system performance without regard to size or power requirements.

As the designs of personal computers evolve, smaller and smaller unit sizes are resulting. For pocket and handheld computers, a premium is placed on both small unit size and low power.

A conventional approach to reducing the size of a computer system is to integrate as much of the computer as possible into a chip set comprised of a small number of semiconductor chips or into a single semiconductor chip. Presently, the technology has progressed to the level of integration that permits a microprocessor to be integrated with other system components but has not progressed to the level of integration that permits an entire PC computer to be integrated into a single semiconductor chip.

Irrespective of the level of integration, in order for functions within chips to be useful, access to those functions must be provided through I/O pins. Therefore, as the level of integration increases, the number of pins on a semiconductor chip tends to increase also.

In order to significantly reduce the size of small systems, the number of I/O pins needs to be reduced in conjunction with an increased level of integration. Furthermore, these (decreased pins and increased integration) changes must be accomplished without degrading the functionality or without significantly impacting the performance of the system.

Conventional small system architectures utilize separate special-purpose buses for interfacing to devices with different parameters such as different speeds and different addressing characteristics. For a typical example, the ISA bus is designed to interface with standard PC XT/AT peripherals while the memory bus is designed to interface with DRAM memory. Also separate special-purpose buses for video memory and internal high-speed peripherals are conventional. The use of these different types of special-purpose buses in conventional highly-integrated systems requires use of many I/O pins and the presence of these I/O pins inhibits making smaller and more lightweight systems.

The "smaller than notebook" (palm-top) computers in addition to being smaller and more lightweight than conventional systems also require low power consumption so as to have long battery life. These requirements are difficult to achieve using the multiple numbers of special-purpose buses of conventional PC computers.

One function that requires excessive bus activity is refreshing of DRAM. Typically, DRAM must be refreshed at a rate of once ever 15.625 microseconds (512 refresh cycles in 8 milliseconds). For an XT, each refresh cycle is approximately 1 microsecond. Therefore, over 6% of the bus bandwidth of a PC/XT computer may be required to perform DRAM refresh if the refresh occurs over the bus.

Techniques have been used to reduce the refresh bandwidth requirements by shortening the refresh cycle of PC/XT, for example, from 1 microsecond to 500 nanoseconds. However, it is believed that no attempt has been made to eliminate the requirement for the bus altogether. Furthermore, with the introduction of the PCMCIA PC Card standard, and the definition within that standard of execute In Place (XIP) whereby software directly executes from PC Cards, DRAM refresh bandwidth requirements use much needed bus bandwidth that would be better used by slower PC Cards.

In typical computer systems, a keyboard scanning subsystem includes a dedicated microprocessor or microcontroller for scanning a keyboard switch matrix. These keyboard scanning sub-systems normally operate at relatively low frequencies, as compared to the main processor frequency, and are idle much of the time waiting for a depressed key input. Even though idle, conventional keyboard sub-systems consume substantial amounts of power which is wasted when the keyboard is idle.

In accordance with the above background, there is a need for an improved architecture for small systems that reduces both size and power consumption while providing good performance.

SUMMARY OF THE INVENTION

The present invention is a data processing system including a central processing unit connected by a common bus to two or more bus devices having different sets of bus parameters. A first set of bus parameters functions as a memory bus for transfers to and from main memory, a second set of bus parameters functions as an I/O bus for I/O device transfers and a third set of bus parameters functions as a video bus for transfers to a video display. Each set of bus parameters has different timing selected to maximize transfers for the particular bus function (main memory, I/O, video or other) implemented by the bus parameters.

In one embodiment, a fourth set of bus parameters functions as other memory (other than main memory) within the address space of the processing unit. Such other memory includes, for example, non-volatile read-only memory (ROM) and/or non-volatile random access memory (RAM). The processing unit communicates over the common bus with such other memory ROM or RAM with common bus timing tailored for such other memory devices.

In one embodiment where memory includes DRAM, an independent DRAM refresh timer and scheduler is used to reduce common bus bandwidth requirements by performing refresh operations during processor cycles which do not access DRAM.

In one embodiment, power consumption by keyboards is reduced whenever the keyboards are idle.

In one embodiment, a set of memory mapping registers is used to support memory arrays, PC Cards and other bus devices.

In one embodiment, PC Card caching is used to obtain lower power consumption and improved performance. Power is reduced to the PC Cards when accesses to the PC Cards are directed to faster system RAM having a cache storing the PC card information.

In accordance with the above summary of the invention, the present invention achieves an improved small computer system having a small size and low power consumption.

The foregoing and other objects, features and advantages of the invention will be apparent from the following detailed description in conjunction with the drawings.

BRIEF DESCRIPTION OF THE DRAWINGS

FIG. 15 depicts a block diagram of the keyboard controller of the engine of FIG. 2.

FIG. 16 depicts a waveform representing the timing of the FIG. 15 keyboard controller.

FIG. 17 depicts a block diagram of the wait state control of the bus processing unit of FIG. 3.

DETAILED DESCRIPTION

Figure 1:
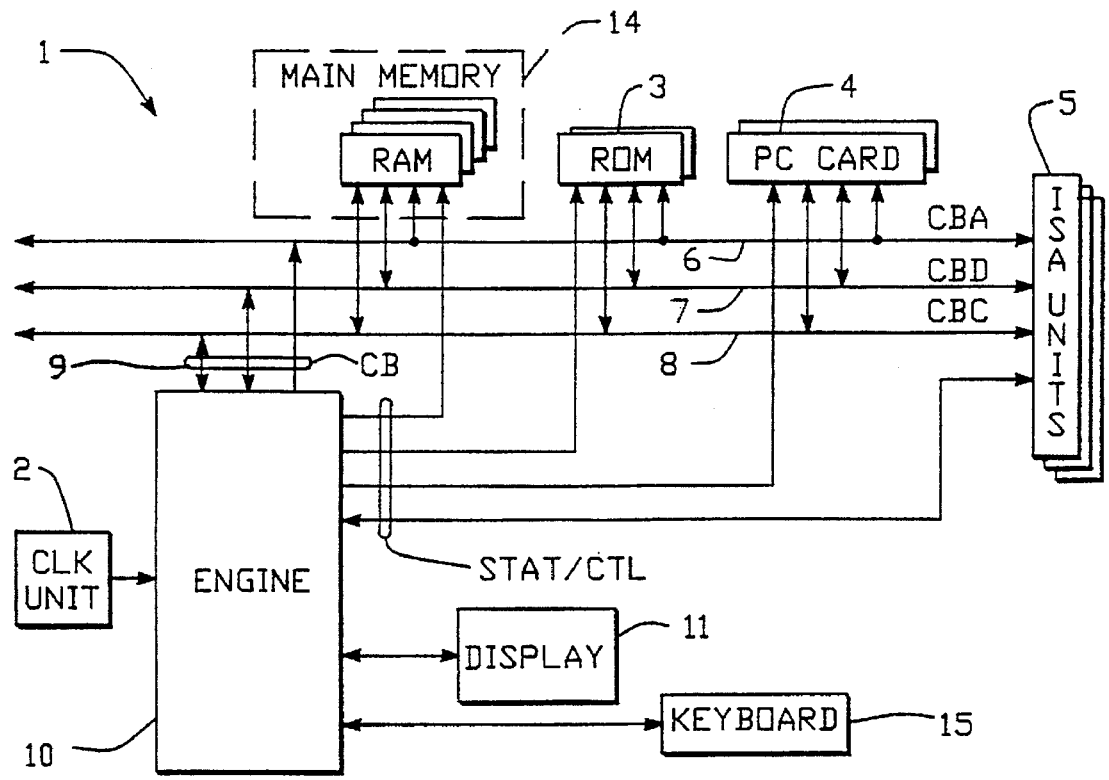
FIG. 1 is a block diagram of the small system in accordance with the present invention.

Computer—FIG. 1

In FIG. 1, a block diagram of a general purpose computer 1 is shown. The computer of FIG. 1 is a small system suitable for use as a "palm-top" computer.

In FIG. 1, the system includes an engine 10 having a common bus (CB) 9. The computer 1 also includes a clock unit 2 for supplying clock signals, a display 11 and a keyboard 15. The common bus 9 includes an address bus (CBA) 6, a data bus (CBD) 7, and a control bus (CBC) 8.. The common bus 9 connects to a number of different bus devices such as random access memory (RAM) which functions as main memory 14, read-only memory (ROM) 3, PC cards 4, and ISA units 5. In the common bus 9, the address bus 6 includes lines A[0:25], the data bus 7 includes lines D[0:7], and the control bus 8 includes lines I/O read (IORD), I/O write (IOWR), memory read (MRD), memory write (MWR), and system clock (SYSCLK).

The address bus (CBA) 6 is a multi-function, multi-speed bus capable of interfacing to fundamentally different bus devices such as DRAM, SRAM, ROM, I/O, and PC cards.

The data bus (CBD) 7 is a multi-speed bus used to transfer data to or from bus devices selected by the address bus 6.

The control bus (CBC) 8 is a multi-speed bus used to provide common control signals to control the transfer of data to or from bus devices selected by the address bus 6. The operational parameters of the address, data and control buses of common bus 9 are determined as a function of the source and destination of the transfer operation over bus 9.

Except for video memory refresh and DMA, none of the common bus 9 operations are competing for common bus 9 at the same time. The single common bus 9, with variable timing and other operating parameters which are determined as a function of the device being accessed, operates to serve the needs of all bus devices without bus contention. DMA and video memory refresh are not in contention because of internal arbitration and priority. For example, in one embodiment video memory refresh has priority over all other common bus 9 operations. DMA has next highest priority and finally CPU operations have lowest priority.

The architecture of the FIG. 1 system allocates addressing space to different devices connected to common bus 9 such as RAM 14, read-only ROM 3, PC cards 4, and ISA units 5. Each of the devices connected to common bus 9 have different timing characteristics. Whenever the address space of a device with a particular timing requirement is addressed, a timing mode for common bus 9 is dynamically selected unique for the addressed device.

In FIG. 1, main memory 14 can include DRAM, SRAM, PSRAM or other memory types and each type requires a particular timing for optimum performance. The timing generated and hence the mode of operating the bus 9 for transfers from and to main memory 14 is dependent on the type of memory device being used. Typically, application programs (AP) and an Operating System (OS) reside in the main memory address space. In one embodiment, main memory 14 also includes memory for video display.

The PC Card 4 typically has the standard interface defined by PCMCIA. Since there are many different types of PC Cards, each type of PC Card has its own identifier. The bus 9 timing mode is selected according to the type of PC Card being used. Since PC Cards are removable from the system, the bus 9 timing is dynamically adjusted whenever a PC card is inserted.

ROM 3 can include different types of ROM such as EPROM, OTPROM, FEPROM or Mask ROM. The bus 9 timing mode for a ROM is adjusted according to the timing requirements for the particular type of ROM being accessed. In order to allow mixed ROM types, the ROM address space is divided, for example, into multiples of 16K bytes where each 16K may be allocated to a different ROM type. Also, write timings are generated for in-circuit programmable devices. The I/O Expansion ISA units 5 are compatible with IBM PC XT/AT timing and have a discrete address space allocation different from the other common bus 9 devices.

Except for video refresh and DMA, the devices connected to bus 9 are not in competition for bus 9. Therefore, the total available bandwidth of bus 9 is shared between video, DMA and the rest of the common bus devices. The video bandwidth is further reduced by having two rotating buffers located internal to the engine 10 for storing data fetched from main memory 14. The buffers in engine 10 are used to refresh the display 11. Additionally, for CGA TEXT mode, a CG ROM or RAM internal to engine 10 is used so that accesses to the bus 9 are reduced up to a factor of 16 compared with ROM or RAM storage external to engine 10.

Figure 2:
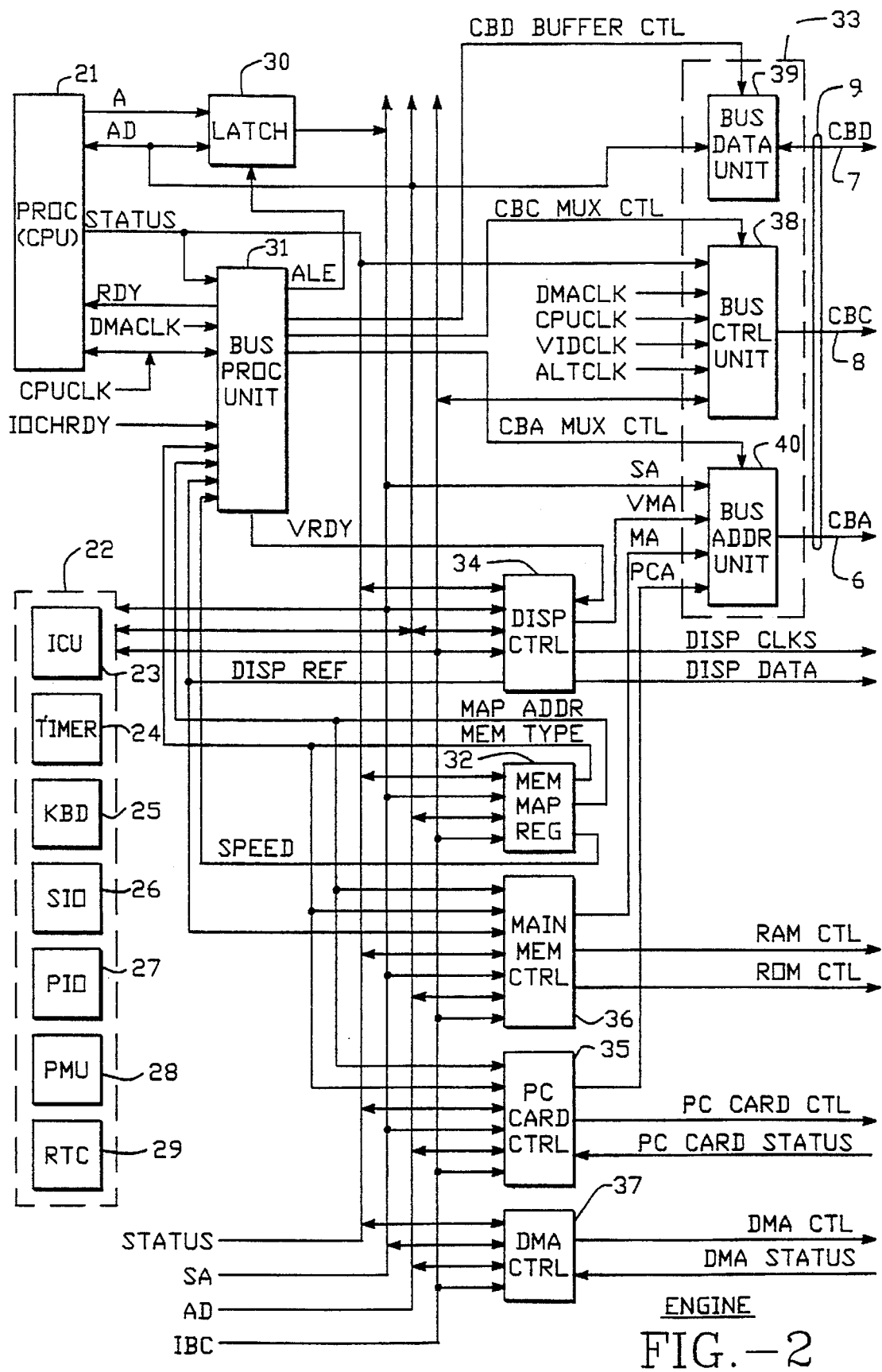
FIG. 2 is a block diagram of the engine which forms part of the FIG. 1 system.

Common Bus Engine—FIG. 2.

In FIG. 2, further details of the engine 10 of the FIG. 1 system are shown. In FIG. 2, the engine 10 includes a processor (PROC) 21, core unit 22 including conventional logic for PC computers. The core unit 22 includes interrupt request control unit (ICU) 23, a timer (TIMER 24, a keyboard control (KBD) 25, a serial input/output interface (SIC) 26, a parallel input/output interface (PIO) 27, power management unit (PMU) 28, and a real-time clock (RTC) 29 supporting static RAM for battery backed set-up information.

In FIG. 2, the engine 10 also includes display control (DISP CTRL) 34, memory map registers (MEM MAP REG) 32, PC card control (PC CARD CTRL) 35, main memory control (MAIN MEM CTRL) 36, and direct memory access control (DMA CTRL) 37.

In FIG. 2, the common bus 9 is output from the common bus connection unit 33 which includes a bus data unit 39, a bus control (CTRL) unit 38 and a bus address (ADDR) unit 40.

The common address bus (CBA) 6 is derived from the bus address unit 40. The bus address unit 40 is a multiplexor which functions under control of the CBA MUX CTL signal from bus processing unit 31 to select one of the special purpose internal buses, namely, system address bus (SA), video memory address bus (VMA), PC card address bus (PCA), or main memory address bus The common data bus (CBD) 7 is derived from the bus data unit 39 of FIG. 2. The bus data unit 39 is a bidirectional buffer which functions under control of the CBD BUFFER CTL signal from bus processing unit 31 to buffer data from or to the data bus (CBD) 7.

The common control bus (CBC) 8 is derived from the bus control unit 38 of FIG. 2. The bus control unit 38 functions under control of the CBC MUX CTL signal from bus processing unit 31 to provide control information to the control bus (CBC) 8.

While the clock unit 2 of FIG. 1 has been shown external to engine 10, typically clock unit 2 is internal to engine 10 and functions to provide a plurality of clock signals to control different timing within the computer system.

ASIC Implementation.

The engine 10 is suitable for implementation as an application-specific integrated circuit (ASIC) that facilitates the FIG. 1 system being constructed as a small footprint computer which is compatible, for example, with the IBM PC/XT architecture. In an IBM PC/XT compatible embodiment, the engine 10 is typically implemented as follows:

Processor 21 is functionally like static versions of conventional CPU's such as Intel 80CXXX processors including 80C88, 80C86, and 80C186 processors.

DMA CTRL 37 is functionally like Intel 8237A PC/XT compatible DMA unit.

ICU 23 is functionally like Intel 8259A PC/XT compatible Interrupt Control Unit.

TIMER 24 is functionally like Intel 8253/8254 PC/XT compatible timer.

KBD 25 is functionally like Intel 8255 compatible PC/XT Keyboard Interface.

SIO 26 is functionally like National Semiconductor NS16450 PC/XT compatible Serial Port.

PIO 27 is functionally like Intel 8255 compatible PC/XT Parallel Port.

RTC 29 is functionally like Motorola MC146818 Real Time Clock supporting Static RAM for battery backed set-up information.

PMU 28 is functionally like Vadem VG-647 Power Management Unit.

MAIN MEM CTRL 36 is functionally like Vadem Core Logic VG-501, VG-502, or VG-330 supporting ROM, DRAM or SRAM.

PC Card CTRL 35 is a controller supporting ROM, RAM, or I/O in a PCMCIA compatible manner.

DISP CTRL 34 is functionally like Vadem VG-600 CGA compatible sub-system supporting CGA and non-CGA resolution LCDs with modifications described hereinafter.

One preferred embodiment of the engine 10 is based upon the components identified above to provide a small computer system compatible with the PC/XT. However, other components can be utilized in the present invention for PC/XT compatibility or for other system compatibility. For example, PC/AT, PC/386 or other components may be selected for the engine 10 if PC/AT, PC/386 or other system compatibility is desired.

For any family of components and functions, in order to reduce the size (footprint) of the computer system, the number of I/O pins needs to be reduced as compared with the number of I/O pins for conventional small system computers. When I/O pins are eliminated, the circuitry that normally is connected to the eliminated I/O pins is also eliminated thereby reducing the size of the system even further.

The reduction in I/O pins is achieved for engine 10 of FIG. 1 by eliminating one or more special-purpose buses that exist in conventional small systems and in place thereof providing a common bus 9 to serve all common bus devices.

Additionally, a video display buffer for servicing display 11 is implemented in the main memory 11. Therefore, since the video display buffer is accessed via the common bus 9, I/O pins and special circuitry for video display is reduced.

In order to reduce power consumption in the engine 10, an internal display controller 34 in engine 10 contains a line buffer 50 (see FIG. 5) which allows character and attribute information to be read out of the video display buffer in main memory once per character line instead of once per display raster line. This display controller 34 reduces text mode display fetches to main store over the common bus 9 by as much as 94% and hence considerably enhances the performance of common bus 9. The system of FIG. 1 with the above sub-system designs provides the functionality of the PC/XT architecture with a small footprint (small base area) and with low power consumption.

Internal Engine Buses.

In FIG. 2, the engine 10 includes a number of internal buses which include an Address (A) bus, an Address/Data (AD) bus and a STATUS bus from processor 21, a System Address (SA) bus from latch 30, a Memory Address (MA) bus from main memory controller 37, a PC Card Address (PCA) bus from PC card controller 35, a Video Memory Address (VMA) bus from display controller 34.

Each internal bus is independently controlled by logic specifically designed for that bus function. Bus processing unit 31 determines the type of transfer and the source and destination of the transfer and selects the appropriate inputs and outputs for the common bus 9.

Internal A Bus and AD Bus.

The internal multiplexed microprocessor buses (A and AD buses) are analogous to the address and data pins of the Intel 80C86/80C88 family of processors. The A bus and the AD buses are multiplexed and provide address information during the first part of a CPU cycle and then, during the second part of the cycle, the A bus is used to indicate program status and the AD bus is used to transmit or receive data. During CPU cycles, the A bus and AD bus are latched in latch 30 to generate the SA bus.

Internal System Address Bus.

The internal system address bus (SA) is driven by one of two sources, either from the processor 21 through latch 30, or by the DMA controller 37. In either case, the SA bus is used to provide addresses for the Memory Address (MA) bus, for the PC Card Address (PCA) bus, or for the Video Memory Address (VMA) bus.

Internal Memory Address Bus.

The addresses for the internal memory address bus (MA) are derived in main memory controller 36 from the SA bus. The main memory controller 36 converts the SA address into one of two formats, a multiplexed Row/Column format for interfacing to DRAM, or a latched address format for SRAM. In both cases, the address driven onto the MA bus is determined by the address present on the SA bus and the contents of the MEM mapping registers 32 pointed to by the SA bus elements SA[14:19].

Internal PC Card Address Bus.

The addresses for the internal PC card address bus (PCA) are derived from the SA bus. The PC card controller 35 determines the PCA bus address as a function of the address present on the SA bus and the contents of the MEM mapping registers 32 pointed to by the SA bus elements SA[14:19].

Internal Video Memory Address Bus.

The addresses for the internal video memory address bus (VMA) are generated as a result of one of two causes, either processor 21 or DMA controller 37 places a CGA compatible display buffer address on the SA bus, or alternatively the internal display controller 34 has been granted control of the main memory 14 in order to perform display refresh. When the processor 21 or DMA controller 37 attempts access to the CGA display buffer, the display controller 34 translates this address into the physical address in main memory 14 where the video display buffer resides and provides this address onto the VMA bus. Likewise, when the display controller 34 is granted control of main memory 14 to perform display refresh, the display buffer address is output on the VMA bus.

Internal Data Bus.

Data is transferred on the internal AD bus from processor 21 to the bus data unit 39 and from there to external memory or I/O via the D[0:7] pins of common data bus 7. These pins are also used during video RAM accesses. Since engine 10 does not contain DMA devices, the D[0:7] pins forming the CBD external data bus 7 are tri-stated by bus data unit 39 during DMA cycles to prevent bus contention between external memory and I/O.

Internal Status Bus.

The STATUS bus from processor 21 provides bus control and bus cycle status which is used by bus control unit 38 to determine timing strobes and a clock source for external sub-system devices connected to common bus 9. Timing for control bus 8 is generated either by the processor 21 clock source, CPUCLK, or by an alternate clock source, ALTCLK, specified during engine 10 initialization and derived from clock unit 2 of FIG. 1. The processor 21 clock source, CPUCLK, from clock unit 2 generates the control bus timing strobes and clock during accesses to main memory 14 (RAM), the BIOS ROM 3, or PC cards 4. The selection of these values is controlled by the SPEED values stored in the memory mapping registers 32 of FIG. 8 which are loaded under control of system software.

The alternate clock source, ALTCLK, from clock unit 2, which typically operates at speeds compatible with the ISA bus (4.77 Mhz or 8 Mhz), generates the control bus timing strobes and clock outputs during accesses which occur when the SPEED indicator selects the alternate clock source.

Timing for accesses to the video display buffer 50 (FIG. 5) are based upon CPUCLK during CPU reads and writes, and the display controller's clock source, VIDCLK, during display refresh cycles.

The STATUS bus, among other things, includes the S0, S1, S2 bits and an AEN bit. The AEN bit is a conventional bit asserted by the DMA controller 37 of FIG. 2 whenever a DMA operation is in control.

Figure 3:
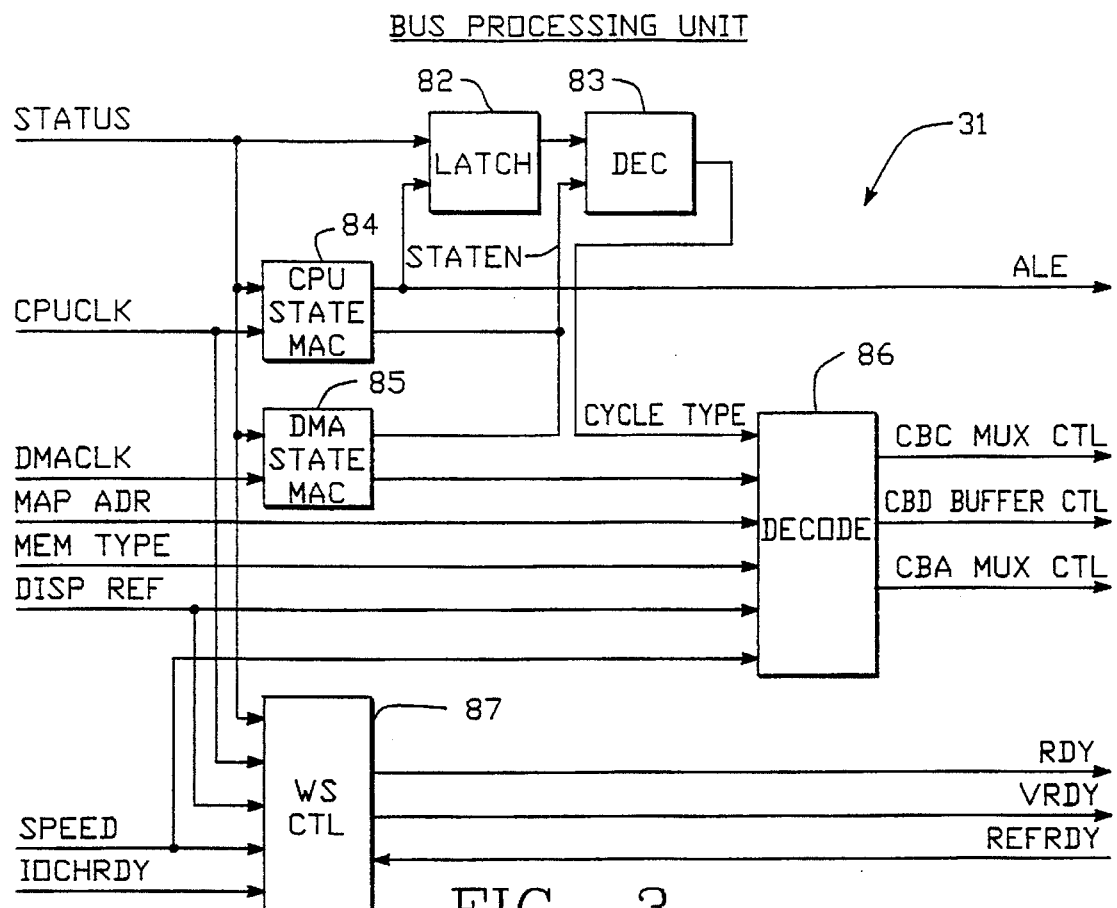
FIG. 3 is a block diagram of the bus processing unit within the engine of FIG. 2.

Bus Processing Unit—FIG. 3

Each internal address bus (A, AD, SA, MA, PCA, VMA) of the engine 10 is independently controlled by conventional logic associated with its function in a manner well known for the PC architecture. Examples of such conventional logic are the components identified above under the "ASIC Implementation" heading.

When the processor 21, or another bus master requests an access to a device that in a conventional system would be accessed over a particular special-purpose bus, addresses for that device are provided to the A[0:25] field of the common bus 9 in engine 10.

In FIG. 3, the bus processing unit 31 of FIG. 2 is shown in greater detail. The status on the STATUS bus from the processor 21 in FIG. 2 is latched into the status latch 82 during CPU cycles. The CPU cycles are monitored by the CPU STATE machine (MAC) 84 which is clocked by CPUCLK which also clocks processor 21.

The CPU STATE machine monitors the S0 and S1 bits of STATUS when AEN is not asserted and upon either S0 or S1 having a negative-going transition, the ALE line is asserted and latches STATUS (S0, S1, S2) into latch 82. At the negative-going transition of t2, one clock cycle after ALE is asserted, STATUS is valid as indicated by STATEN being asserted.

Figure 11:
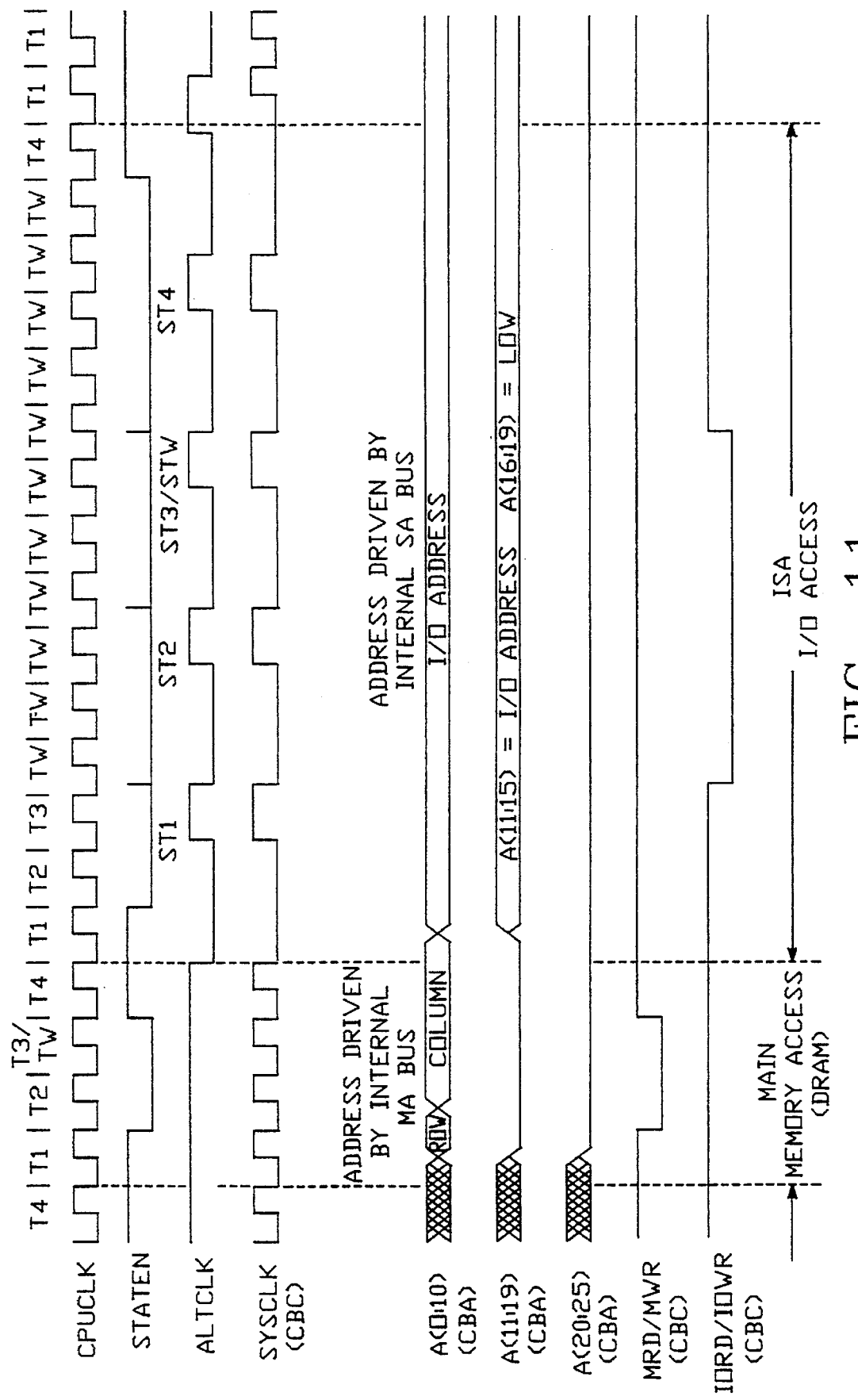
FIG. 11 depicts a timing diagram for the common bus of FIG. 1 operated with a main memory access.
Figure 12:
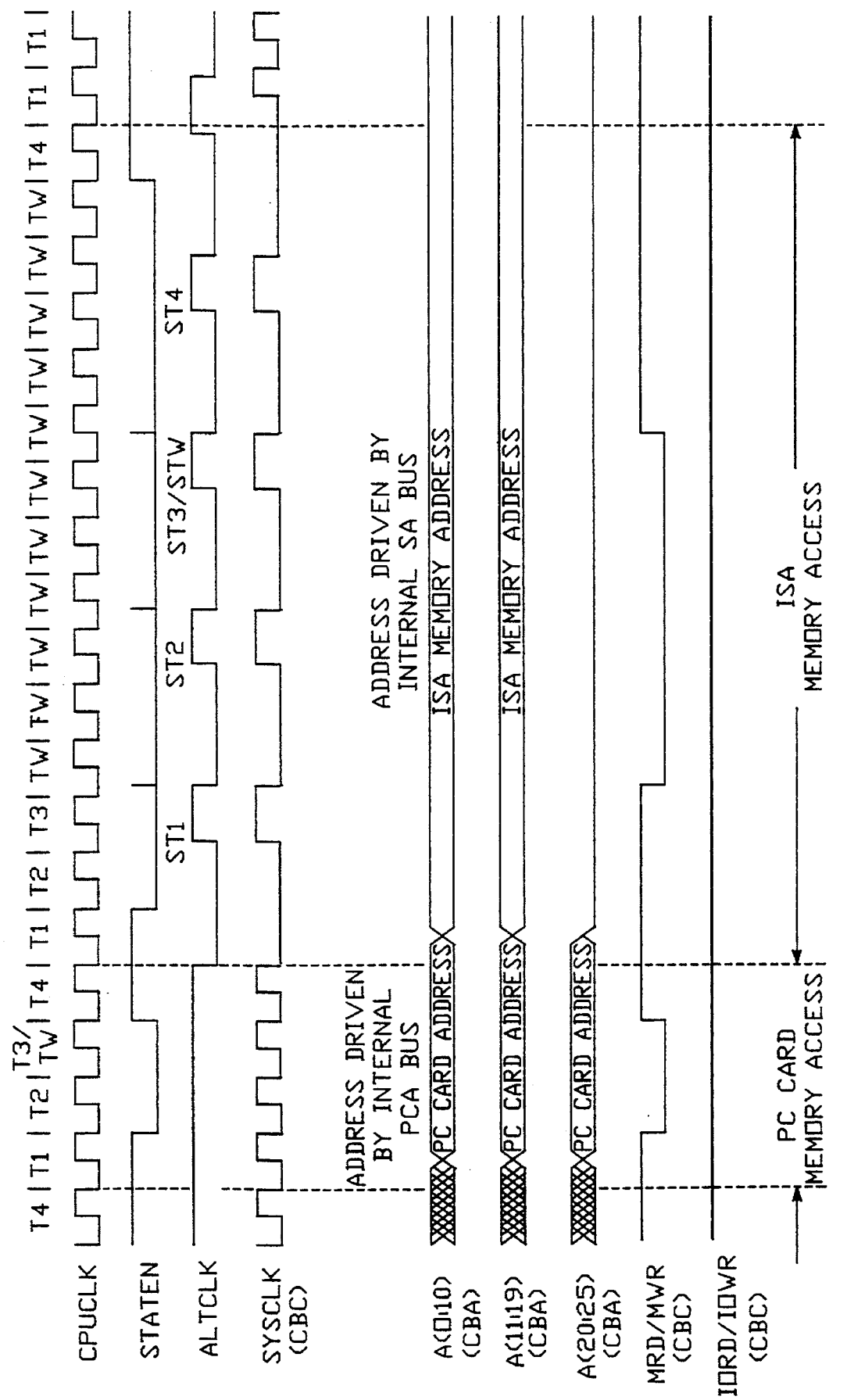
FIG. 12 depicts a timing diagram for the common bus of FIG. 1 operated card memory access and an ISA memory access.

As shown in FIGS. 11 and 12, STATEN is initially asserted during T2 and T3 until the beginning of T4 when STATUS signals S0, S1 and S2 have all returned to 1's. STATEN is again asserted a second time at the beginning of T2 continuing through T3, through eleven wait states, TW, until the beginning of T4.

The STATEN signal is asserted and remains asserted during DMA cycles by the DMA STATE MAC 84 until STATUS changes as indicated by S0 and S1 being 1's.

In FIG. 3, a DMA STATE machine (MAC) 85 monitors DMA cycles and is clocked by DMACLK. Decoder 83 decodes a CPU operation from the status latch 82 or a DMA operation from the DMA state machine 85 and indicates either a DMA or CPU cycle with a CYCLE TYPE signal to the decoder 86.

Figure 14:
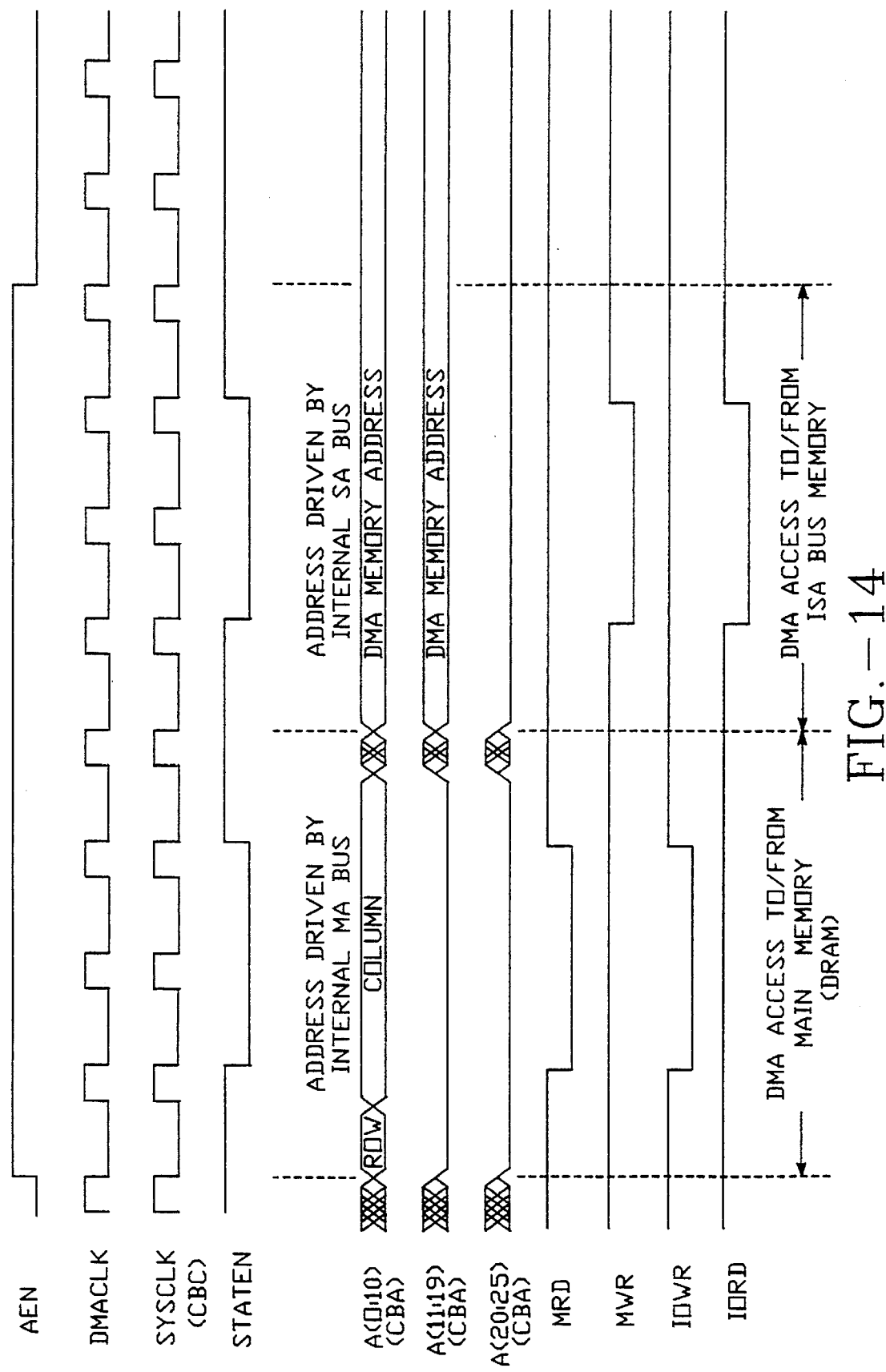
FIG. 14 depicts a timing diagram of the common bus of FIG. 1 operated for DMA transfers.

In FIG. 3, the DMA STATE MAC 85 senses when the AEN bit from the STATUS bus is asserted in order to control DMA operations. As shown in FIG. 14, the asserted AEN bit is present during the entire DMA operation. Whenever AEN is asserted, the STATEN signal is asserted whenever an IORD or an MEMR signal is valid.

Decoder 85 receives the CYCLE TYPE signal, the DISP REF signal from the DISPY CTRL 34 in FIG. 2, the MEM TYPE signal and the MAP ADR signal from the MEM CTRL 32 of FIG. 2. Decoder 86 uses these signals to select the bus control unit 38, bus data unit 39 and bus address unit 40 from the common bus connection unit 33 in FIG. 2. Specifically, decoder 86 provides the CBC MUX CTL signal to bus control unit 38, provides the CBD BUFFER CTL signal to bus data unit 39, and provides the CBA MUX CTL signal to bus address unit 40.

The wait state control (WS CTL) 87 receives the SPEED, I/O channel ready (IOCHRDY), DISP REF, CPUCLK, REFRDY and STATUS inputs and provides the RDY signal to the processor 21 to control WAIT states and outputs the VRDY signal to the display control 34 to acknowledge that control of main memory has been released.

The bus processing unit 31 decodes the bus CYCLE TYPE and MEM TYPE indicators to generate control signals used to select the internal address bus and speed classification for the current operation of common bus 9.

The internal address bus selection is made according to the cycle type. Bus operations directed to I/O devices use the internal SA bus. Bus operations directed to memory devices use one of the internal SA, MA, PCA, or VMA buses depending upon the state of the DISP REF and MEM TYPE indicators. While the DISP REF signal is asserted, the other internal address buses are ignored and the VMA bus is selected to drive the A[0:25] address bits on bus 9. While the DISP REF signal is deasserted, the MEM TYPE indicators are used to select one of the internal buses for the current operation of common bus 9. MEM TYPE includes information as to the memory type and the access rights of the memory. Memory types include RAM, ROM, and PC Card. The access rights define whether a particular memory type is assigned as READ Only, WRITE Only, READ/WRITE, or DISABLED.

When a memory bus cycle is detected, the MEM TYPE indicators are checked to determine the memory type and access rights. Multiple memory types for the same bus cycle are permitted, however, they must have different access rights, or similar addressing methods. Each selected memory type's access rights are checked against the cycle type, Read cycle or Write cycle. If the memory type specified is enabled for that type cycle, then its corresponding address bus is output on the A[0:25] bits of bus 9. If the access rights for that device indicate that it is not enabled, the A[0:25] bits are driven by the internal SA bus, or from the internal address bus of one of the other memory devices, if it has also been specified within the MEM TYPE indicators and meets the access rights for that cycle.

The speed classification of the cycle is determined by the SPEED indicators. These signals define the bus timing clock source and the number of bus wait states which are to be added to the current bus cycle. The bus timing clock source may be selected as FAST which uses the processor clock source, CPUCLK, or SLOW which uses the alternate clock source, ALTCLK. The number of bus wait states applied to the current bus cycle determines the number of extra bus clock cycles that will be required before the bus cycle can be completed.

When the speed classification is SLOW, or when it is FAST and the number of wait states is not zero, the bus processing unit forces the CPU to extend the bus cycle to allow the accessed device enough time to respond. This is accomplished by controlling the RDY signal to processor 21. The bus processing unit 31 extends CPU cycles as a result of one of four requesting sources, internally specified wait states, through the use of the IOCHRDY signal available on the STAT/CTL bus from ISA units 5 of FIG. 1 or when the internal display controller 34 asserts DISP REF to request control of the bus to perform display refresh operations or when REFRDY is asserted indicating that DRAM must be refreshed.

During CPU cycles, bus status is decoded from the processor STATUS bus, S[0:2] signals, as follows:

| S2 | S1 | S0 | Bus Operation |
|----|----|----|---------------|
| 0  | 0  | 0  | Interrupt Acknowledge |
| 0  | 0  | 1  | Read I/O |
| 0  | 1  | 0  | Write I/O |
| 0  | 1  | 1  | Halt |
| 1  | 0  | 0  | Instruction Fetch (Read Memory) |
| 1  | 0  | 1  | Read Memory |
| 1  | 1  | 0  | Write Memory |
| 1  | 1  | 1  | Passive (no bus cycle) |

During DMA cycles, bus status is derived from the DMA STATUS line of DMA controller 35 as follows:

| IORD = 0 | Read I/O and Write Memory |
|----------|---------------------------|
| MEMR = 0 | Read Memory and Write I/O |

Figure 4:
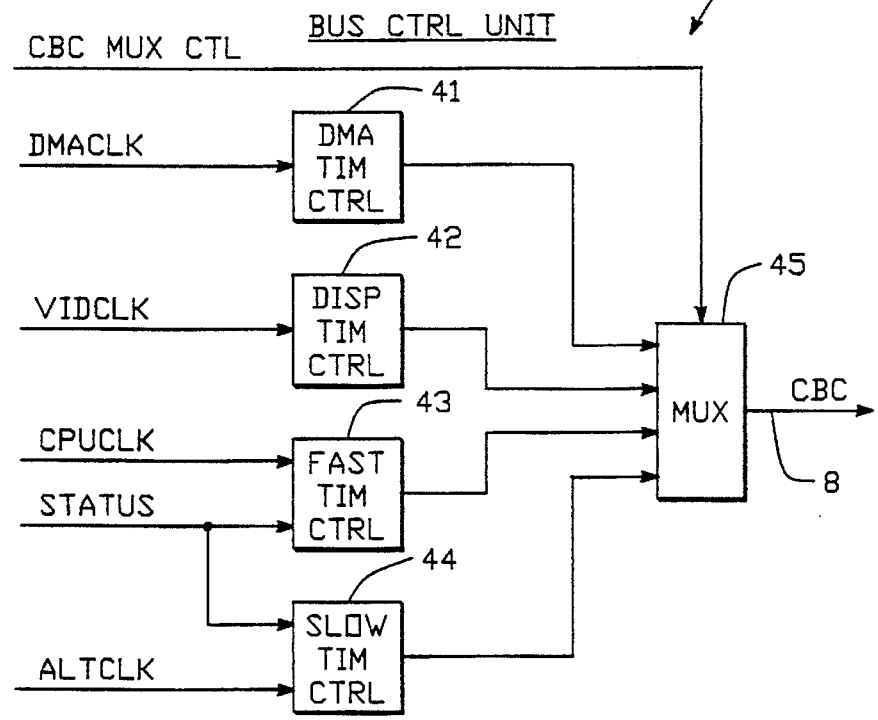
FIG. 4 is a block diagram of the bus control unit within the engine of FIG. 2.

Bus Control Unit—FIG. 4

In FIG. 4, further details of the bus control unit 38 of FIG. 2 are shown. The bus control unit 38 includes a number of timing generators which operate in a conventional manner to generate timing control signals for the PC architecture. Specifically, the DMA timer control (TIM CTRL) 41 generates DMA control signals in response to a DMACLK signal from clock unit 2 of FIG. 1. The display timer control (DISP TIM CTRL) 42 generates display control signals in response to a VIDCLK signal from clock unit 2 of FIG. 1. The FAST timer control (TIM CTRL) 43 generates fast clock signals in response to a CPUCLK signal from clock unit 2 of FIG. 1. The SLOW timer control (TIM CTRL) 44 generates slow clock signals in response to an ALTCLK signal from clock unit 2 of FIG. 1. Multiplexor 45, under control of the CBC MUX CTL signal from bus processing unit 31 of FIG. 2, selects the appropriate one of the timers 41, 42, 43, or 44 to be connected to the external CBC bus 8.

The selection of signals is as follows.

| | Access Type: Memory Read | | |
|---|---|---|---|
| MEM TYPE | A[0:25] Bus Source | Control Bus Signals Asserted | Other Control Signals Asserted |
| RAM | MA Bus | MEMR | RAS/CAS (DRAM) or CS (SRAM/PSRAM) |
| DISP RAM | VMA Bus | MEMR | RAS/CAS (DRAM) or CS (SRAM/PSRAM) |
| PC CARD | PCA Bus | MEMR | CS (PC Card) |
| ROM | MA Bus | MEMR | CS (ROM) |

| | Access Type: Memory Write | | |
|---|---|---|---|
| MEM TYPE | A[0:25] Bus Source | Control Bus Signals Asserted | Other Control Signals Asserted |
| RAM | MA Bus | MEMW | RAS/CAS (DRAM) or CS (SRAM/PSRAM) |
| DISP RAM | VMA Bus | MEMW | RAS/CAS (DRAM) or CS (SRAM/PSRAM) |
| PC CARD | PCA Bus or SA Bus | MEMW | CS (PC Card) |
| ROM | SA Bus or MA Bus | MEMW | CS (ROM) |

| | Access Type: I/O Read or I/O Write | | |
|---|---|---|---|
| Address Range | A[0:25] Bus Source | Control Bus Signals Asserted | Other Control Signals Asserted |
| 00000H–0FFFFH | SA Bus | IORD or IOWR | None |

Figure 5:
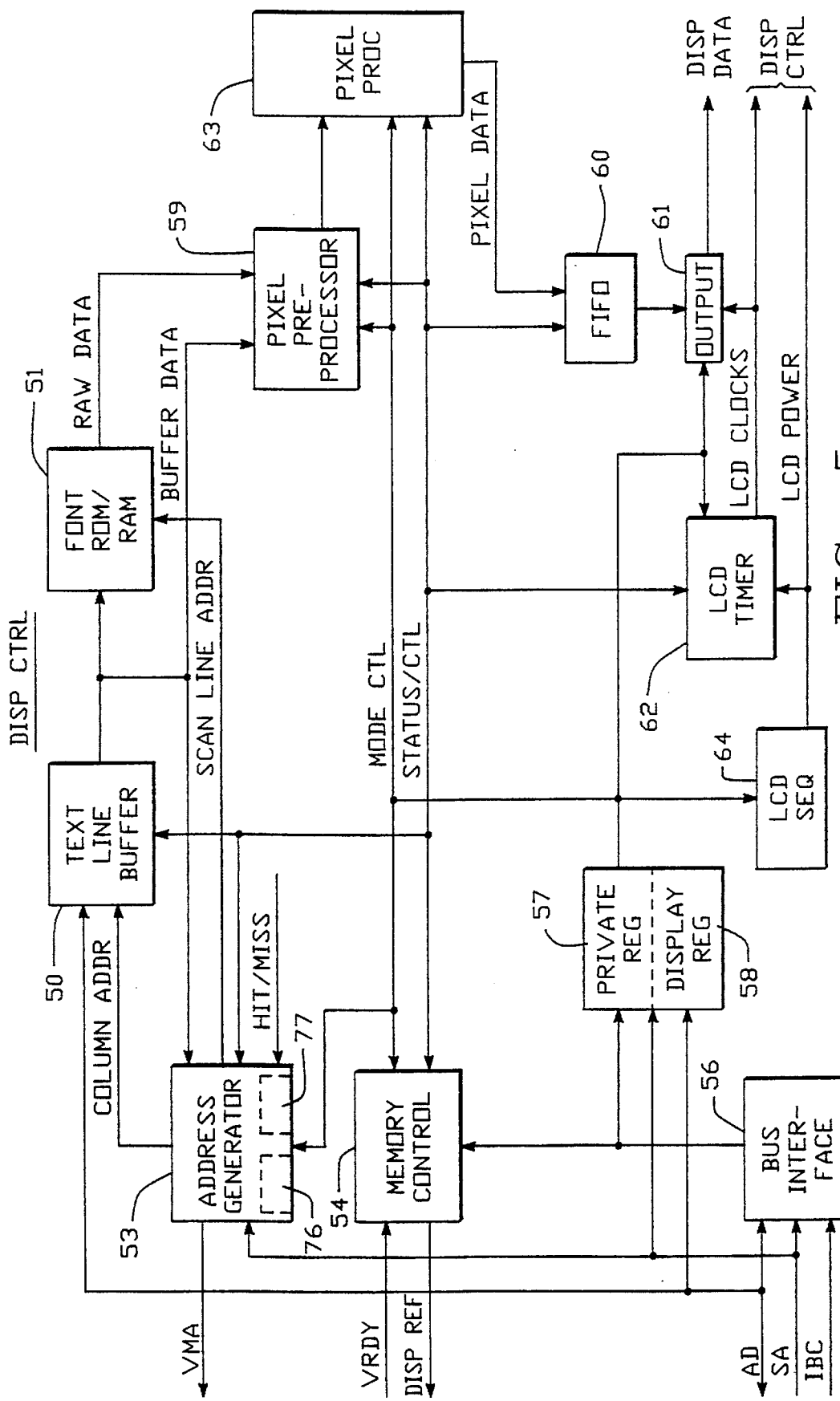
FIG. 5 is a block diagram of the display controller within the engine of FIG. 2.

Display Controller—FIG. 5

In FIG. 5, further details of the internal display controller 34 of FIG. 2 are shown. The design and function of the display controller of FIG. 5 is like that of the Vadem VG600 display controller with the addition of the buffer 50, font memory 51 and FIFO buffer 60. These added units allow display information to be stored in the engine 10 and hence reduce the number of common bus 9 accesses that are required to support display functions.

For the CGA mode of operation, the display image (and therefore the visual image provided by display 11 of FIG. 1) is 640 pixels in the horizontal X-axis direction and 200 pixels in the vertical Y-axis direction. Each character is formed by an 8×8 matrix of pixels so that the 640×200 pixel image forms a 80×25 character image matrix, that is, 80 columns of characters in 25 character rows.

The display memory for the 640 by 200 pixel image (80×25 character image) matrix is located in main memory 14 commencing at address B8000 (hex). Since two bytes of data are stored for each of the 2000 characters in the 80 by 25 character image matrix, the total display memory in main memory 14 used for CGA text characters is 4000 bytes. For each character in text mode operation, one of the two bytes is an encoded representation of the text character and the other byte represents character attributes for the encoded character.

In operation, the display controller 34 repeatedly accesses the display memory in main memory 14 to obtain all 4000 bytes of data for all 2000 characters. For each character, display controller 34 decodes the character to form the 64 pixels for the character and outputs the pixels to the display 11 of FIG. 1 to paint the visual image for that character. After completing the operation for 4000 bytes (2000 characters), display controller 34 repeats the operation over and over again so that the visual image is continuously repainted. Application programs from time to time, in a well known manner, write new data into the display memory in main memory 14 and in this way the visual image becomes changed to correspond to the newly written data when display controller 34 paints the image including the changed data to display 11.

In FIG. 5, display controller 34 receives SA(0:25) addresses on the SA bus and receives or transmits data AD(0:7) to the system on the AD bus. The addresses on the SA bus start with base address of B8000 (hex) specified by bits SA(16:25) plus an offset specified by SA(0:15) into the font display memory 51. Although main memory 14 of FIG. 1 reserves 32K bytes as display memory, CGA text processing only employees 4K bytes. Addresses of display data connect to the bus interface 56 which in turn provides addresses to the memory control 54. An address generator 53 generates addresses for the VMA bus, for output to the common bus CBA of FIG. 1, whenever a memory access to the main memory 14 of FIG. 1 is required for display data. In order to reduce main memory accesses, address generator 53 addresses 80 characters (160 bytes) at a time from main memory 11. Eighty characters corresponds to one character line in the display image. Address generator 53 includes a character counter 76 for counting 180 bytes for providing the two-byte, 80-character column address (COLUMN ADDR) to buffer 50. The character counter is incremented one byte for each byte increment on the VMA address bus to synchronize transfer of data from main memory 14 to buffer 50.

Data to and from the main memory 14 appears on the AD bus and is stored in a dual-line text line buffer 50. Accesses from the main memory 14 are on an 80 character (160 byte) text line basis for storage in buffer 50. The buffer 50 is a 320 byte, dual 160 byte, buffer. A first 160 byte buffer is filled with transfers from main memory 14 at the column address specified by address generator 53 while a second 160 byte buffer is unloaded to provide character data to be decoded for forming the display pixels. After each cycle, the functions of the first and second 160 byte buffers are reversed.

The buffer data in buffer 50 is passed to a font memory 51 which is either a ROM or a RAM memory. The memory 51 is addressed by the encoded buffer data from the buffer 50 to produce the pixels for the text characters to be displayed. The two-byte encoded data for each character from buffer 50 addresses font memory 51 to obtain an 8×8 pixel map for that addressed character, one pixel scan line (8 bits) at a time.

Address generator 53 includes a scan counter 77 for counting from 1 to 8 pixel scan lines to provide a pixel scan line address (SCAN LINE ADDR) to font memory 51. The scan counter 77 is incremented once for each carry-out of the character counter 76. Accordingly, the first pixel scan line (8 pixels for each character) for each of the 80 characters in buffer 50 is obtained from font memory 51 and this scan line is processed a character pixel scan line (8 pixels) at a time and output to the FIFO 60. The second pixel scan line for each of the 80 characters in buffer 50 is obtained from font memory 51 and is processed and output to the FIFO 60. The process continues with the third through eighth pixel scan lines for each of the 80 characters in buffer 50, obtained from font memory 51, processed and output to the FIFO 60. After all eight scan lines are processed for all 80 characters, a new character line of 80 characters from buffer 50 is processed in the same manner. The processing repeats in a continuous manner.

The pixels for each text character scan line from the font memory 51 are aligned in the pixel preprocessor 59 and are then transferred to the pixel processor 63. The processed pixel data is stored into the first-in-first-out (FIFO) buffer 60. Buffer 60 is eight bits wide corresponding to one scan line of a character. From buffer 60 the data to be displayed is transferred to the output register 61. The FIFO 60 permits the loading of data into buffer 50 to occur in character line burst mode while isolating that operation from display 11 which requires data at a uniform non-bursty rate for the best visual appearance.

In the embodiment of FIG. 5, the display 11 of FIG. 1 is a liquid crystal display (LCD). In that embodiment, the timing required for an LCD display is generated in the LCD timer 62.

Also, depending upon the manufacturer's requirements of the LCD display 11, the power sequencing required for the display is controlled by the LCD sequencer 64.

The DISP DATA bus from register 61, the LCD CLOCK bus from LCD timer 62, and the LCD POWER bus from LCD sequencer 64 connect to the display 11 of FIG. 1.

In FIG. 5, an indication of the type of display 11 connected to the display controller 34 of FIG. 5 is stored in the register 57.

The display controller 34 of FIG. 5 provides the video display buffer address for both processor 21 read/write cycles and display refresh operations. During processor 21 read/write accesses to the video display buffer in main memory 14, timing is based upon processor CPUCLK and controlled by the main memory controller 36 of FIG. 2. During display refresh operations, access to the video display buffer is based upon VIDCLK and controlled by the display controller 34 of FIG. 2.

To perform display refresh, the FIG. 5 display controller 34 first obtains control of the address bus 6, the data bus 7 and control bus 8 by issuing the DISPREF signal to bus processing unit 31 of FIG. 2. When the bus processing unit acknowledges the DISPREF signal by asserting the VRDY signal, the display controller 34 then begins a burst read from the display memory in main memory 14 using a DMA-type operation.

During this time, the internal line buffer 50 in the display controller 34 is filled with the data read out from main memory 14. Once the line buffer 50 has been filled, the display controller 34 returns control of the address, data and control buses of common bus 9 to the processor 21 by releasing the DISPREF signal.

In text mode, the internal line buffer 50 is updated once every character line (25 times per one frame cycle). In graphics mode, the line buffer must be updated every raster line (200 times per frame or 400 times per frame).

The engine 10 supports ROM based character fonts internal to the display controller of FIG. 5 or RAM based character fonts located in the display memory in main memory 14.

For ROM based character fonts, the outputs of the line buffer 50 are used to address one of the font bit maps stored in the internal ROM 51. This operation eliminates the requirement for external memory cycles on common bus 9 to fetch font bit maps from main memory 14 and therefore reduces display controller power consumption and common bus bandwidth requirements.

Figure 6:
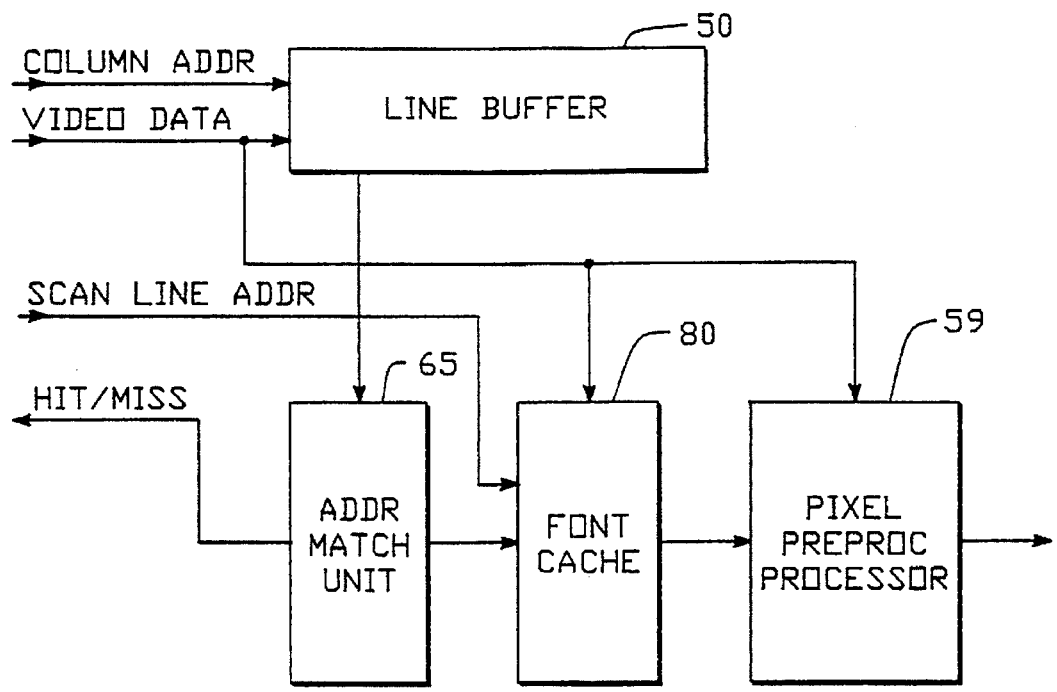
FIG. 6 depicts a modification of the FIG. 5 display controller incorporating a font cache.

Font Cache—FIG. 6

In FIG. 6, a modification to the display controller of FIG. 5 is shown. In FIG. 6, the line buffer 50 and the pixel preprocessor 59 are the same as in FIG. 5. In FIG. 6, the address/match unit 65 and font cache 80 are a caching means for caching fonts accessed from main memory 14.

For RAM based character :fonts, the engine 10 utilizes font bit map cache 80 to store font bit maps (pixel maps). The accessing of locations storing font bit maps in cache 80 is by address/match unit 80. Frequently accessed character fonts are stored in cache 80 as part of the display controller of FIG. 5 which is internal to engine 10 of FIG. 2.

When the column address reads out a character code from line buffer 50, the character code is matched with the character codes in the address match unit 65. Character codes are preloaded into unit 65 in a conventional manner, for example, under software control. If a match occurs, the corresponding associative address in font cache 80 is accessed to obtain the pixel map for the current character for the current scan line. The pixel map is input to pixel preprocessor 59. If no match occurs in match unit 65, the HIT/MISS line is asserted signaling address generator 53 in FIG. 2 to obtain the pixel map from main memory 14.

During display refresh cycles, when a cache hit occurs, that character's font bit map is read from the cache 80 and an external memory access to main memory 14 or other common bus device is not required. When a miss occurs, the HIT/MISS line from address/match unit 65 signals to obtain the missing font bit map from main store 14.

After determining the probable frequency of occurrence of characters within a particular character set, the bit map font cache 80 is loaded with a pixel map for the characters with the highest probable frequency of occurrence. With cache 80 thus loaded, a significant performance gain is obtained even when cache 80 is relatively small (as compared to the size of RAM required to store the bit maps for the entire character set). Using such a cache, power consumption is reduced and common bus bandwidth required for the display is reduced.

In one particular example, the bit maps for the ten highest frequency of occurring characters are stored in font cache 80. In one example, the highest frequency of occurrence characters are the letters E, T, A, O, N, R, I, S, H and D. The bit maps for the remaining 16 characters are stored in main store 14 and accessed when needed.

| Typical Frequency of Occurrence of English Text Characters | | | | | |
|---|---|---|---|---|---|
| Letter | Frequency | Letter | Frequency | Letter | Frequency |
| E | 13.1% | D | 3.8% | W | 1.4% |
| T | 10.5 | L | 3.4 | B | 1.4 |
| A | 8.6 | F | 2.9 | V | .91 |
| O | 8.0 | C | 2.8 | K | .41 |
| N | 7.1 | M | 2.5 | X | .16 |
| R | 6.8 | U | 2.5 | J | .13 |
| I | 6.3 | G | 1.9 | Q | .12 |
| S | 6.1 | Y | 1.9 | Z | .07 |
| H | 5.3 | P | 1.9 | | |

Figure 7:
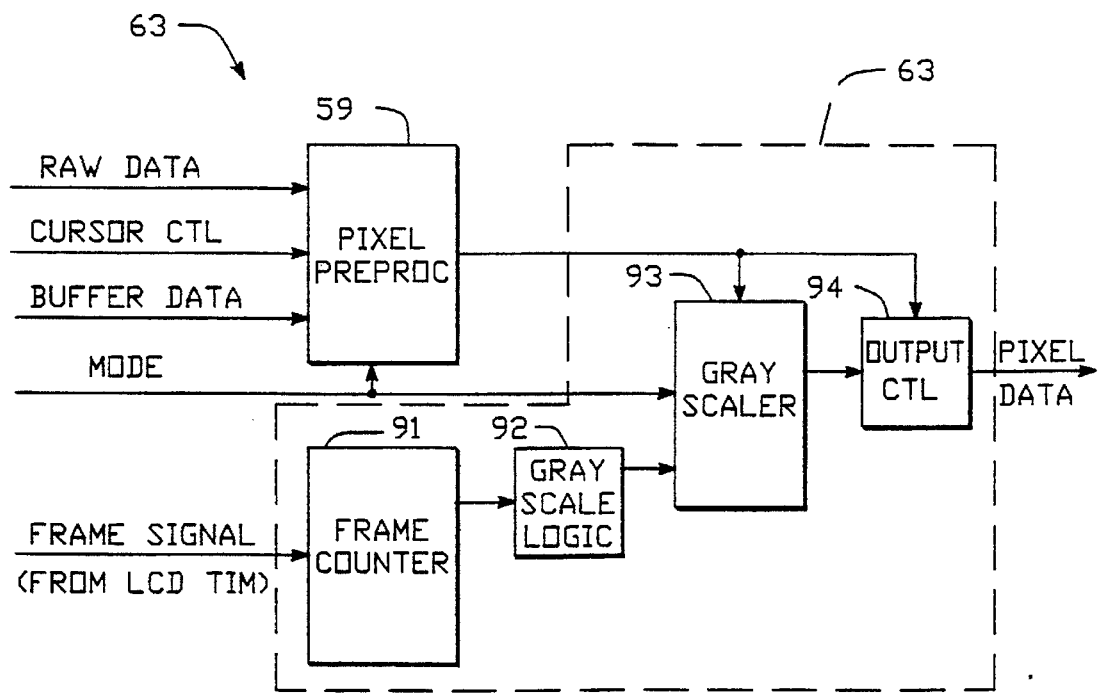
FIG. 7 depicts a pixel preprocessor and a pixel processor which form a part of the display controller of FIG. 5.

Pixel Preprocessor And Pixel Processor—FIG. 7

In FIG. 7, the pixel preprocessor 59 and the pixel processor 63 are shown in further detail. The pixel preprocessor 59 selects from the ROM DATA from the font ROM 51 in FIG. 5 and/or the BUFFER DATA from the line buffer 50 of FIG. 5 as a function of the MODE signals from the registers 57 or 58 of FIG. 5. In text mode, both ROM DATA and BUFFER DATA are used. In graphic mode, only BUFFER DATA is used.

The pixel preprocessor 59 of FIG. 7 includes an attribute decoded and a data mux. The selected processed data from the pixel preprocessor 59 is input to the gray scaler 93 and to the output control 94 to provide the output pixel data to FIFO 60 in FIG. 5.

The pixel processor 63 of FIG. 7 includes a frame counter 91 which counts the frame signal (FRAME SIGNAL) which is one of the LCD CLOCKS from the LCD timer 62 of FIG. 5. The frame counter 91 controls the gray scale ROM 92 which in turn feeds the gray scaler 93 to form the gray scale level for the output in the output control 94. Output control 94 receives the cursor control (CURSOR CTL) line, one of the control lines (CTL) from memory control 54 of FIG. 5, to control the cursor in the video image.

Figure 8:
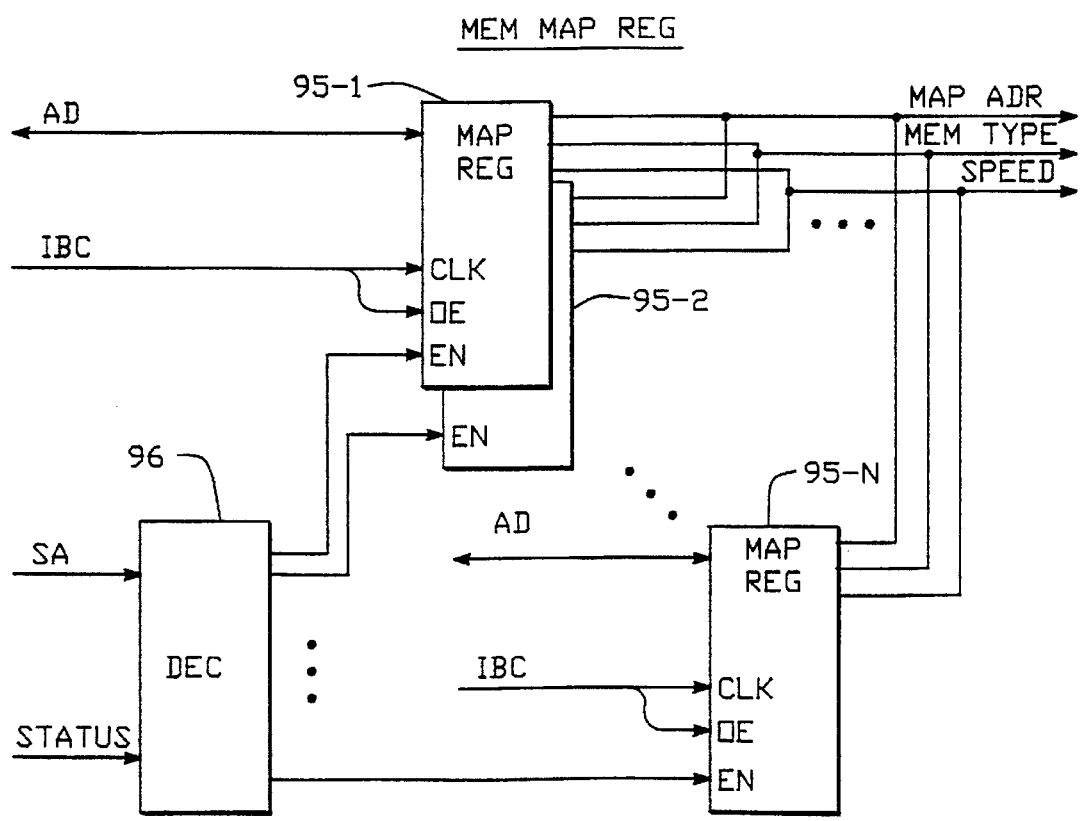
FIG. 8 depicts a block diagram of a memory mapping unit within the engine of FIG. 2.

Memory Mapping Controller—FIG. 8

In FIG. 8, further details of the memory mapping registers 32 of FIG. 2 are shown. In FIG. 8, up to N mapping registers 95-1, 95-2, . . . , 95-N are present. The decoder 96 receives the SA bus and the STATUS bus and decodes an enable line to enable one of the mapping registers 95 for any address on the SA bus. The enabled one of the mapping registers 95 provides the remapped output address MAP ADR.

The memory mapping algorithm is a superset of the Lotus/Intel/Microsoft Expanded Memory System (LIM EMS) mapping algorithm. The organization of the mapping registers in FIG. 8 differs from LIM EMS in that besides providing an EMS page address and page enable bit, these registers are also used to specify the type of memory device addressed and the type of access permitted, MEM TYPE, and the speed classification (SPEED) of the memory device.

The memory mapping registers include the following fields for defining MEM TYPE: MAP_EN, RAM_RD, RAM_WR, ROM_RD, ROM_WR, PC_RD, and PC_WR, includes a SPEED field and a wait state field WS_V, and an address mapping field Page_Address (A14:25).

In one embodiment described, a total of 64 mapping registers are supported, one for each 16 Kbyte section of the 1 Mbyte memory address space. Each mapping register 95 in addition to the above fields includes a field, MAPEN, specifying a page map enable.

The page map enable field determines whether the page addressed by the SA page address bits is mapped into system memory using the Page_Address field from the enabled register 95. When the page is disabled, the page address bits are ignored and the MAP ADR signals are driven directly by the SA bus.

The memory type bits determine the type of device installed at the memory location represented by the mapping register. These bits are also used to specify the type of accesses permitted to the memory. Each memory type, RAM, ROM, and PC Card, has a read enable and a write enable bit. A particular type of memory is made readable by setting its read enable bit, and writable by setting its write enable bit. When neither the read enable nor write enable bits are set, that memory type is disabled.

Finally, the speed classification bits are used to define the access rate of the memory devices. The speed classification bits provide two levels of classification, first the number, WS_V, of wait states the device requires, and secondly the timing reference clock, SPEED. The wait state bits may be used to cause from zero to $2^n-1$ extra bus clocks to be inserted into accesses to a particular memory device, where n (equal to the value in WS_V) indicates the number of wait state bits used. The SPEED field is used to specify the timing reference clock. In the embodiment described, the SPEED field is a single bit that selects either CPUCLK or the alternate clock, ALTCLK, as the timing source for the bus cycle.

When MAPEN, the page address enable bit, is asserted, the page address specified by A(14:25) is enabled and an access to the memory region represented by the Memory Mapping register will be directed to the page address. When the MAPEN bit is not asserted, the page address bits A14–A25 are ignored.

The RAMRD, RAMWR, ROMRD, ROMWR, PC_RD and PC_WR bits are stored in the registers 95 to specify the type of memory present at the memory region represented by the memory mapping registers, and also to specify the memory's access rights. When one of RAMRD, ROMRD, or PC_RD is asserted, the memory type is selected as RAM, ROM, or PC Card, respectively, and is enabled during Memory Read cycles. Any combination of RAMWR, ROMWR, or PC_WR may be enabled.

Using this dual enable scheme (Read enable/Write enable), any region of the memory map may be defined as RAM, ROM, or PC Card. Furthermore, any region of the memory may be defined as read only, write only, read/write, or disabled. This allows RAM to shadow ROM, PC Cards to shadow RAM, or any combination of RAM/ROM/PC Cards. It also provides the ability for any or all of the memory map to be disabled (all Read enable and Write enable bits not asserted), so that external memory control logic may be utilized.

Figure 9:
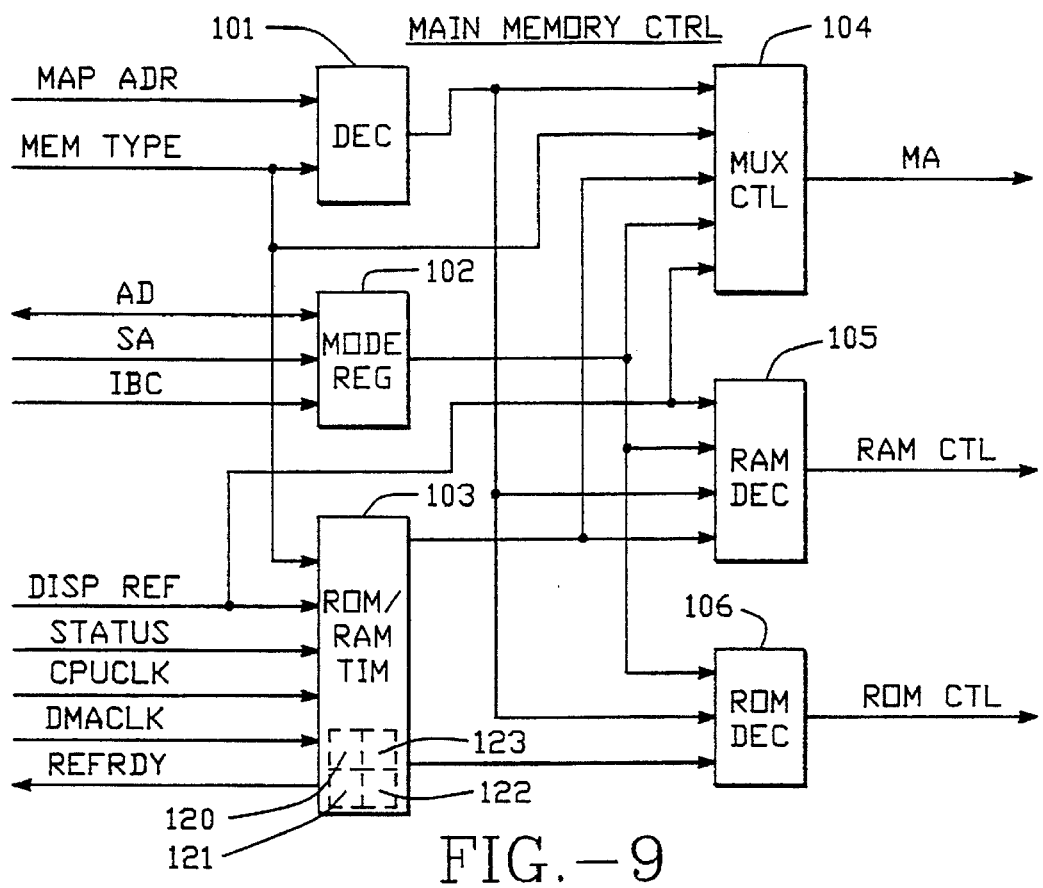
FIG. 9 depicts a block diagram of the main memory controller within the engine of FIG. 2.

Main Memory Controller—FIG. 9

In FIG. 9, further details of the main memory controller 36 of FIG. 2 are shown. The main memory controller includes a decoder 101 which decodes the MAP ADR and the MEM TYPE signals to enable the MUX control (CTL) 104, the RAM decoder (DEC) 105 and the ROM decoder (DEC) 106. The mode register (MODE REG) 102 receives the AD, SA and IBC signals and stores them as inputs to the MUX control 104, the RAM decoder 105 and the ROM decoder 106. The ROM/RAM timer 103 generates conventional timing for ROM and RAM memory based on the presence of the DISP REF signal, the STATUS input, the CPUCLK, and the DMACLK signals.

The RAM timing is input to the RAM decoder 105 to provide the RAM CTL signals and when ROM signals are used, the ROM decoder 106 input from timer 103 provides the memory control signals ROM CTL.

An independent DRAM refresh timer 120 and scheduler 121 are used to reduce common bus 9 bandwidth requirements by performing refresh operations during processor (CPU) 21 cycles which do not access such DRAM.

By using a separate DRAM refresh timer, processor 21 cycles which address I/O or memory regions not occupied by DRAM are used to perform refresh cycles. During the aforementioned cycles, main system DRAM memory is refreshed using a self-refresh mode supported by many DRAMs called. CAS before RAS refresh (CBR). To perform CBR refresh all that is required is for the CAS then RAS lines of the DRAM to be pulsed. A refresh counter 122 generates the refresh address when main memory 14 is DRAM memory.

In order to support the refresh counter 122, an independent refresh timer 120 periodically generates requests to the memory controller 36 of FIG. 9 for refresh cycles. Memory controller 36 monitors both the status of the refresh timer and activity on the bus and, when appropriate,, initiates DRAM refresh cycles.

The refresh timer 120 is like the refresh timer used in conventional PC/XT computers. Typically the rate of the refresh timer is software programmable and will normally be selected to expire every 15 microseconds (normal refresh DRAM) or 125 microseconds (slow refresh DFM) to produce a refresh request (RREQ). However, unlike conventional PC/XT computers, when the refresh timer expires, a DRAM refresh cycle is not guaranteed to take place since the actual refresh operation is controlled by the refresh scheduling logic 121.

The refresh scheduling logic 121 accepts refresh requests RREQ from the refresh timer and maintains a request count in a request counter 123. Following each request RREQ triggered by the refresh timer 120, the scheduling logic begins monitoring processor 21 bus activity. When an I/O cycle or a memory cycle which does not address system DRAM is detected, the scheduling logic initiates a CAS before RAS refresh cycle with a refresh command (REF). The refresh cycles continue on subsequent I/O or non-DRAM memory cycles until the request count reaches zero. Therefore, refresh cycles are queued up during periods of heavy DRAM memory activity and executed when the DRAM goes idle.

In some cases, DRAM memory may be active for extended periods of time preventing refresh cycles. Once the number of pending refresh requests has exceeded a predetermined number (signalled by a carry-out from the request counter 123), the refresh scheduling logic 121 gains control by asserting a refresh ready, REFRDY, signal to wait state control 87 in the bus processing unit 31 of FIG. 3. When wait states are inserted, a burst refresh operation is performed to empty the refresh queue. When empty, the request counter is reset back to 0 and REFRDY is not asserted.

Figure 10:
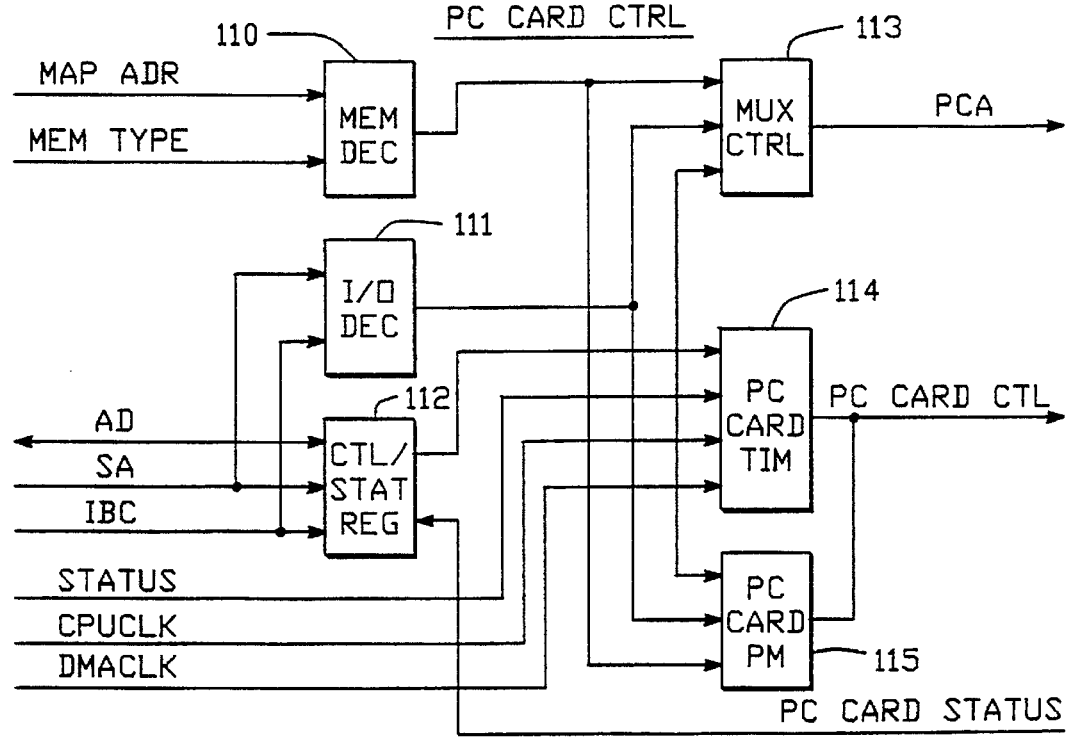
FIG. 10 depicts a block diagram of the PC card controller within the engine of FIG. 2.

PC Card Controller—FIG. 10

In FIG. 10, further details of the PC Card control 35 of FIG. 2 are shown. In FIG. 10, the MEM decoder 110 receives the MAP ADR and MEM TYPE inputs to decode the conditions under which a PC Card is to be active on the common bus 9. The decoder 110 enables the MUX control 113 and the PC Card PM 115. The I/O decoder 111 in FIG. 10 receives the SA and CTL inputs and decodes the presence of an I/O operation. The decoder 111 enables the MUX control 113 and the PC Card PM 115. The control state register 112 receives the SA address and the CTL input to enable the PC Card timer 114. The PC Card timer 114 receives in addition the STATUS, the CPUCLK and DMACLK inputs to generate the PC Card control signals. The PC Card status is input to the status register 112 and output on the AD bus.

The engine 10 supports PCMCIA compatible PC cards. Up to two cards may be supported through the MEM mapping registers 32. Each mapping register is capable of addressing any one of the 4096-16 Kbyte PC card pages (64 Mbytes).

Each PC Card identifies the number of wait states required for that card. Upon installation of the card, software queries the card and determines the speed and configures the mapping registers of FIG. 8 accordingly.

The system of FIG. 1 employs PC Card caching resulting in lower power consumption and improved performance by allowing power to be removed from PC Cards and accesses to PC Cards to be directed to faster system RAM.

PC cards are utilized in a number of ways including memory functions for storing application programs which are loaded from the PC card into main system memory and then executed from main memory, including memory functions for non-volatile storage of data files, and including memory functions for storage of application programs which may be directly executed from the PC Card in accordance with the execute In Place standard (XIP).

Other uses for PC Cards, such as for expanding base system memory size, also exist. When utilizing PC Cards as diskette-like memories, it is desirable in battery powered applications to remove power from the PC Cards when they are not in use. For PC Cards which contain standard application software this does not pose much of a problem since the PC Card is typically accessed quite infrequently. In operation when an access to the PC card is required, the system BIOS or PC Card driver reapplies power to the PC Card and then copies the application program into system RAM. Thereafter, the application program executes from system RAM and power is removed from the PC Card.

However, for PC Cards which are used for XIP execution of programs, power management becomes more difficult. When an application is executing, it is doing so directly from memory on the PC Card. Therefore, in order to reduce the power consumption of the card, execution must be stopped or redirected to another memory location.

In order to redirected PC card accesses to another memory location, the contents of PC Cards are cached in part of main system memory. The operation is supported by a combination of software services provided by the BIOS or Operating System (OS) PC Card driver and PC Card I/F hardware. Although this approach is targeted for XIP type software applications, it also suitable for standard software applications as well as for non-volatile storage.

Following insertion of a new PC Card, the PC Card driver software applies power to the PC Card socket and determines the type and format of the card installed. Since PC Cards will typically be treated as rotating drives, access to data on the cards will normally be initiated via the operating system (OS). In the case of XIP, the user typically inputs the application name at the OS prompt and the PC Card software driver copies a loader stub for the application into main system memory. This loader stub then, through the PC Card software driver, maps the software application into system memory via the PC Card memory page frames.

Normally, the application continues to execute from the memory on the PC Card in the system memory map defined by the PC Card memory page frames. However, for this invention, when the PC Card software driver maps the PC Card memory into system memory, it also copies this memory into another set of EMS memory page frames compatible with the PC Card memory page frames. And, when execution begins, it does so from the EMS memory not the PC Card memory. Since the XIP application must communicate with the PC Card software driver when mapping additional regions of PC Card memory into system memory, the PC Card software driver is able to replace the EMS memory regions with new PC Card memory regions. As a result cache coherency is maintained by software. Also, using the locality of code principle, most accesses will be directed to EMS memory instead of PC Card memory, thereby allowing power to the PC Card to be removed for extended periods of time. Another benefit is that the PC Card application software will be executing from system memory which will normally be significantly faster than the PC Card memory.

The memory mapping described in connection with FIG. 8 allows a single set of memory mapping registers to be used to support both expanded memory system (EMS 4.0) memory arrays and PC Cards simultaneously. Expanded memory is used in personal computer systems to increase the effective memory space beyond the 1 Mbyte supported by 8088/86 compatible microprocessors and 80286 and 80386 microprocessors running in Real mode. Expand memory system (EMS) pages are mapped into the 1 Mbyte system memory space through the page mapping registers of FIG. 8.

The PC Cards are also mapped into the system memory using page mapping registers of FIG. 8 thereby using one compatible memory mapping technique. The same page mapping registers used to map EMS memory into system memory are also used to map PC Cards. To render the mapping generic, the conventional EMS mapping registers are extended to include memory type designators, EMS or PC Card. Through the memory type designator, any or all of the page mapping registers may be defined for use by either memory type. As a result, the entire system memory can be defined, if desired, as PC Card memory and executed entirely from PC Cards.

With such PC card operation, the BIOS and OS can suspend operation and save the entire state of the system, the PC Card can then be removed from a first computer system and reinserted into a second computer system, and execution can then be resumed in the second system. This type of portability goes beyond simply transferring application software and data files between systems. Users having compatible systems can stop an application executing on one computer and restart the same application, in the same spot, on another computer.

Keyboard Controller—FIG. 15

In FIG. 15, details of the keyboard controller 47 of FIG. 2 are shown. Keyboard controller 47 is used to reduce the power consumption of the keyboard 15 of FIG. 1. The keyboard controller 47 of FIG. 15 includes a programmable timer 125 that is controlled by a status signal KBYBSY to alternately disable and enable the clock, KBYCLK, to the keyboard 15. Timer 125 is a conventional timer that is loaded with a number from register 124 whenever the KBYBSY signal is asserted. The register 124 is loaded with a number from the AD bus under software control by signals on the internal control bus IBC. Timer 125 counts down the loaded number from register 124 to 0 and then asserts the CLKEN enable signal to gate 126. When thus enabled, gate 126 outputs the SCANCLK as the KBYCLK.

In a conventional manner, software in the keyboard 15 performs the keyboard scan and then informs the keyboard controller 47 of FIG. 15 of the status of the keyboard, idle or busy, via the KBYBSY status signal.

Referring to FIG. 15 and 16, the KBYCLK clock to the keyboard 15 is periodically enabled when programmable timer 125 counts down and issues the CLKEN signal. Once the KBYCLK clock is enabled, the keyboard 15 immediately sets the KBYBSY status line and then scans the keyboard to check for a depressed key. If the keyboard 15 finds a depressed key input, the keyboard 15 continues to assert the KBYBSY status line and the depressed key input is serviced. If, at the completion of the keyboard scan operation, another depressed key has not been detected, the keyboard 15 clears the KBYBSY status signal. This causes the keyboard control 47 of FIG. 15 to stop the clock, KBYCLK, to the keyboard 15 and to retrigger the clock restart timer. When the clock restart timer expires, a CLKEN signal is output from timer 125 to gate 126 and the KBYCLK clock to the keyboard 15 is started again and the entire procedure is repeated.

Wait State Controller—FIG. 11

In FIG. 17, further details of the wait-state controller 87 of FIG. 3 are shown. Wait States are generated by wait-state controller 87 as a result of four means, the SPEED indicators, the IOCHRDY signal, the KEFRDY signal, or the DISP REF signal.

Both the SPEED indicators and the IOCHRDY signal use conventional means in controller 87 for inserting CPU Wait States. During every CPU cycle, counter 130 is loaded with the value specified by the SPEED indicators and when this counter rolls over and produces a carry-out (CO), the RDY signal (which enables the processor 21 of FIG. 2 to proceed) is asserted only under certain conditions. In the absence of RDY to processor 21 of FIG. 2, wait states are taken until RDY is asserted.

The conditions that permit RDY to be asserted are controlled by RDY LOGIC 135. If IOCHRDY is deasserted at the time that the counter 130 rolls over and asserts a carry-out (CO), the RDY signal will remain deasserted until IOCHRDY is asserted under control of the output from synchronizer 134. In order for RDY to the CPU to be asserted, both IOCHRDY must be asserted to produce an output from synchronizer 134 and the counter 130 must have rolled over to produce a carry-out.

Both REFRDY and DISP REF also cause wait states to be inserted by causing RDY to be deasserted by logic 135. REFRDY is used to insert CPU wait states so that DRAM may be refreshed. Since REFRDY will only used to insert wait states during accesses to main memory (controlled by the engine of FIG. 2), REFRDY will never be in contention with IOCHRDY. REFRDY may, however, contend with DISP REF for control of the bus. REFRDY is generated by the refresh scheduling logic and is synchronized by that logic to occur at the end of a CPU cycle (T4 state). DISP REF is an asynchronous signal that may occur anywhere within the CPU cycle. Both signals will cause the SPEED counter 130 to be inhibited. Counter 130 will load under control of STROBE 131 but will not count unless enabled by CLK ENABLE 132. CLK ENABLE 132 will not enable counter 130 if REFRDY is deasserted or if VRDY is asserted in response to DISP REF.

REFRDY has precedence over VRDY. If both signals are deasserted simultaneously, REFRDY will be recognized first and then VRDY. REFRDY will never be asserted while DISP REF is asserted since REFRDY is generated at the end of a bus cycle.

Since DISP REF is an asynchronous signal, it requires a positive acknowledgement, VRDY, from the wait state controller of FIG. 17 before the display controller 34 of FIG. 2 can proceed with the display memory access. The synchronization and qualifying logic (S/Q LOGIC) 133 monitors the STATUS lines to determine the end of a CPU bus cycle (T4 state), and DISP REF is sampled at this time. If DISP REF is asserted and REFRDY is asserted, then the VRDY signal is asserted by the logic 133 and a display memory burst fetch may begin. Otherwise VRDY remains deasserted and DISP REF is again sampled by the logic 133 at the end of the next bus cycle.

Operation

Figure 13:
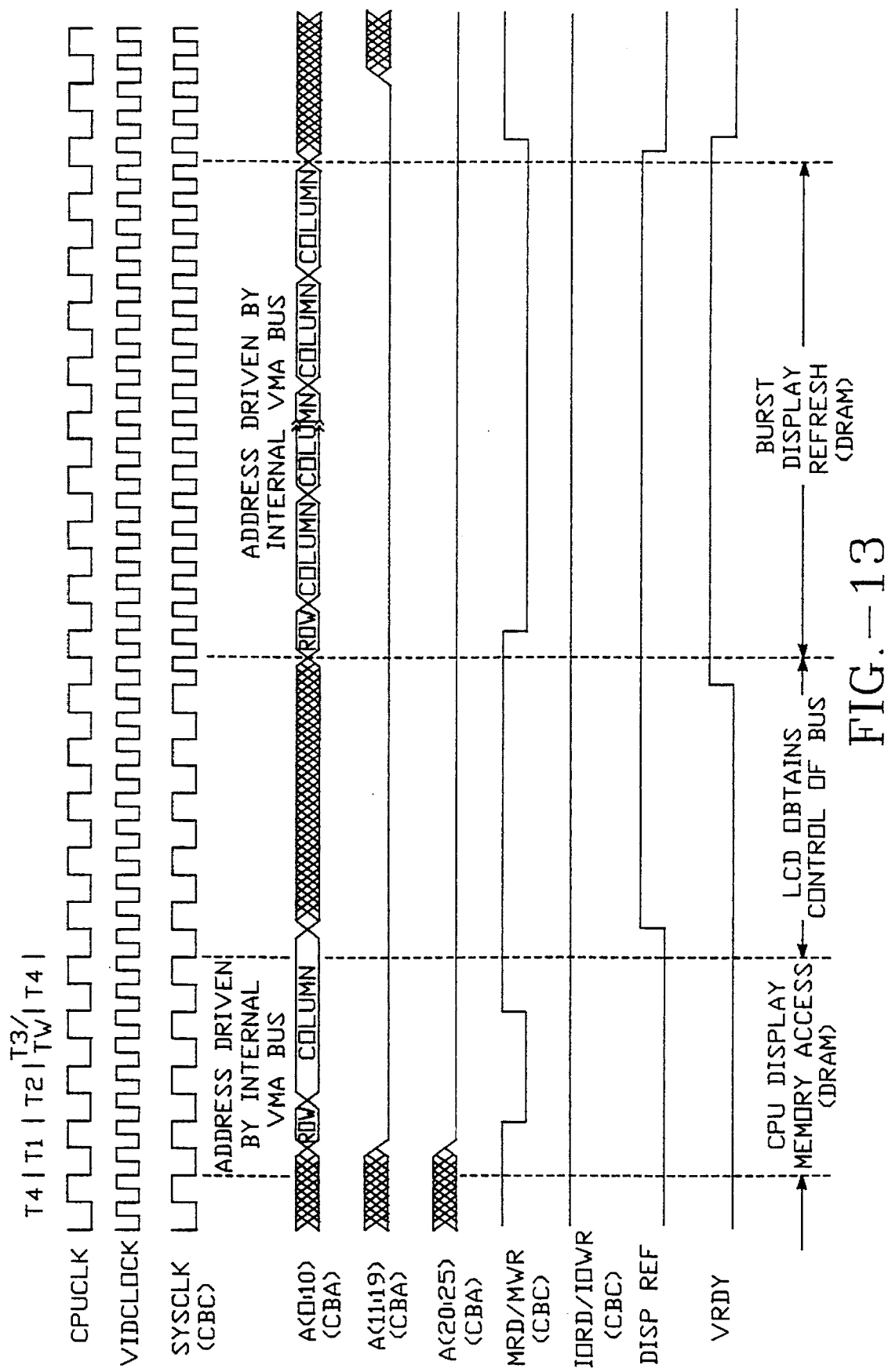
FIG. 13 depicts a timing diagram of the common bus of FIG. 1 operated for display transfers.

The operation of the FIG. 1 system is shown in connection with the timing diagrams of FIG.'s 11 through 14. FIG. 11 depicts a timing diagram for the common bus of FIG. 1 operated with a main memory access. FIG. 12 depicts a timing diagram for the common bus of FIG. 1 operated with a PC card memory access and an ISA memory access. FIG. 13 depicts a timing diagram of the common bus of FIG. 1 operated for display transfers. FIG. 14 depicts a timing diagram of the common bus of FIG. 1 operated for DMA transfers.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data processing system comprising, a processor, a plurality of external bus devices connected to the processor for communicating with the processor at different times, said bus devices operating with different timing parameters that include different information transfer rates associated with different bus bandwidths, a plurality of special-purpose buses each connected to the processor and to one of the external devices and each operating at a different bus bandwidth corresponding to the bus bandwidth associated with the bus device to which it is connected, a single common bus connecting the plurality of external bus devices to the plurality of special-purpose buses, and bus processing means for controlling the bus bandwidth of the common bus, to correspond to the bus bandwidth associated with the external bus device that is communicating with the processor at any one of said different times.

2. The data processing system of claim 1 further including, a keyboard timed under control of a keyboard clock signal, keyboard control means having timing means for enabling and disabling said keyboard clock signal to conserve power consumption by said keyboard when said keyboard clock signal is disabled.

3. The data processing system of claim 1 further including, a keyboard having actuated keys timed by a keyboard clock signal, said keyboard providing a keyboard busy signal in response to a key actuation, keyboard control means having timing means for enabling and disabling said keyboard clock signal in order to conserve power consumption by said keyboard when said keyboard clock signal is disabled, said timing means including a restart timer for periodically enabling said keyboard clock signal where said restart timer is reset by said keyboard busy signal.

4. The data processing system of claim 1 wherein said special-purpose buses include internal address buses for providing internal addresses, wherein said common bus includes a common address bus for common addresses and wherein said system further includes memory mapping registers for mapping said internal addresses to said common addresses.

5. The data processing system of claim 4 wherein said bus devices include PC card memory and wherein said mapping registers map said internal addresses to said PC card memory.

6. The data processing system of claim 4 wherein said bus devices include main memory and PC card memory and wherein said mapping registers map said internal addresses to said PC card memory and to said main memory, said system further including means for storing a copy of PC card memory information in said main memory whereby said main memory operates as a cache for PC card memory.

7. The data processing system of claim 1 wherein, said plurality of bus devices includes one or more memory devices and one or more input/output devices, and said plurality of special-purpose buses includes a memory bus and an I/O bus.

8. The data processing system of claim 7 wherein one of said memory devices includes video memory and said memory bus includes a video bus.

9. The data processing system of claim 7 wherein one of said memory devices is a main memory and said memory bus includes a main memory bus.

10. The data processing system of claim 9 wherein said main memory includes DRAM memory and wherein said system includes an independent DRAM refresh timer and scheduler for performing refresh operations during processor cycles which do not access DRAM whereby greater utilization of the common bus is achieved.

11. The data processing system of claim 7 wherein one of said memory devices is read-only and said memory bus includes a read-only memory bus connected by means of the common bus to the read-only memory.

12. The data processing system of claim 7 wherein one of said memory devices is a non-volatile random access memory and said memory bus includes a non-volatile random access memory bus.

13. A data processing system comprising, a plurality of external bus devices connected to a processor for communicating with the processor at different times, said bus devices operating with different timing parameters that include different information transfer rates associated with different bus bandwidths, and a plurality of components for integration on a common semiconductor chip, including the processor, a plurality of special-purpose buses each connected to the processor and to one of the external devices and each operating at a different bus bandwidth corresponding to the bus bandwidth associated with the bus device to which it is connected, a single common bus connecting the plurality of external bus devices to the plurality of special-purpose buses, and bus processing means for controlling the bus bandwidth of the common bus, to correspond to the bus bandwidth associated with the external bus device that is communicating with the processor at any one of said different times.

14. The data processing system of claim 13 wherein said special-purpose buses include internal address buses, internal data buses, and internal control buses for providing internal addresses, internal data, and internal control, wherein said common bus includes a common address bus, a common data bus, and a common control bus for receiving said internal addresses, said internal data, and said internal control, respectively.

15. The data processing system of claim 13 wherein said special-purpose buses include internal address buses, internal data buses, and internal control buses for providing internal addresses, data, and control, wherein said common bus includes a common address bus, a common data bus, and a common control bus for common addresses, common data, and common control and wherein said connection means includes, a bus data unit for connecting said internal data bus to said common data bus, a bus control unit for connecting said internal control bus to said common control bus, a bus address unit for connecting said internal address bus to said common address bus.

16. The data processing system of claim 13 further including, a keyboard timed under control of a keyboard clock signal, keyboard control means having timing means for enabling and disabling said keyboard clock signal to conserve power consumption by said keyboard when said keyboard clock signal is disabled.

17. The data processing system of claim 13 further including, a keyboard having actuated keys timed by a keyboard clock signal, said keyboard providing a keyboard busy signal in response to a key actuation, keyboard control means having timing means for enabling and disabling said keyboard clock signal in order to conserve power consumption by said keyboard when said keyboard clock signal is disabled, said timing means including a restart timer for periodically enabling said keyboard clock signal where said restart timer is reset by said keyboard busy signal.

18. The data processing system of claim 13 wherein said bus processing means includes, a processing unit state machine for determining a state of said bus processing means, a direct memory access state machine for determining a state of direct memory accesses, a wait state control for determining wait states in said data processing system.

19. The data processing system of claim 13 wherein said special-purpose buses include internal address buses for providing internal addresses, wherein said common bus includes a common address bus for common addresses and wherein said system further includes memory mapping registers for mapping said internal addresses to said common addresses.

20. The data processing system of claim 19 wherein said bus devices include PC card memory and wherein said mapping registers map internal addresses to said PC card memory.

21. The data processing system of claim 19 wherein said bus devices include main memory and PC card memory and wherein said mapping registers map said internal addresses to said PC card memory and to said main memory, said data processing system further including means for storing a copy of PC card memory information in said main memory whereby said main memory operates as a cache for PC card memory.

22. The data processing system of claim 13 wherein,
said plurality of bus devices includes one or more memory devices and one or more input/output devices, and
said plurality of special-purpose buses includes a memory bus and an I/O bus.

23. The data processing system of claim 22 wherein one of said memory devices includes video memory and said memory bus includes a video bus.

24. The data processing system of claim 22 wherein one of said memory devices is a main memory and said memory bus includes a main memory bus.

25. The data processing system of claim 24 wherein said main memory includes DRAM memory and wherein said system includes an independent DRAM refresh timer and scheduler for performing refresh operations during processor cycles which do not access DRAM whereby greater utilization of the common bus is achieved.

26. The data processing system of claim 22 wherein one of said memory devices is a read-only memory and said memory bus includes a read-only memory bus.

27. A data processing system for communicating with a plurality of external devices, said devices operating with different timing parameters that include different information transfer rates associated with different bus bandwidths, the data processing system comprising
a processor;
a plurality of special-purpose buses each connected to the processor and to one of the external devices and each operating at a different bus bandwidth corresponding to the bus bandwidth associated with the bus device to which it is connected,
a single common bus connecting the plurality of external bus devices to the plurality of special-purpose buses, and
bus processing means for controlling the bus bandwidth of the common bus, to correspond to the bus bandwidth associated with the external bus device that is communicating with the processor at any one of said different times.

* * * * *